(12) United States Patent
Wicker

(10) Patent No.: US 6,819,305 B2
(45) Date of Patent: *Nov. 16, 2004

(54) METHOD AND APPARATUS FOR DETECTION OF A VIDEO DISPLAY DEVICE

(75) Inventor: David J. Wicker, San Diego, CA (US)

(73) Assignee: Conexant Systems, Inc., Newport Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,501

(22) Filed: Jan. 28, 1999

(65) Prior Publication Data

US 2002/0005840 A1 Jan. 17, 2002

(51) Int. Cl.[7] .................................................. G09G 5/00
(52) U.S. Cl. ........................................ 345/3.1; 348/476
(58) Field of Search ................................. 345/204, 212, 345/211, 213, 3, 199, 3.1, 2.2, 1.1; 348/450, 476, 477, 478

(56) References Cited

U.S. PATENT DOCUMENTS

| | | | | |
|---|---|---|---|---|
| 4,126,851 A | * | 11/1978 | Okor ........................... | 345/1.1 |
| 4,471,348 A | * | 9/1984 | London et al. .............. | 345/2.2 |
| 5,479,183 A | * | 12/1995 | Fujimoto .................... | 345/3.1 |
| 5,488,384 A | * | 1/1996 | Uehara et al. ............... | 345/3.1 |
| 5,604,510 A | * | 2/1997 | Blanchard ................... | 345/98 |
| 5,771,028 A | * | 6/1998 | Dalton et al. ................. | 345/3 |
| 5,781,174 A | * | 7/1998 | Uya et al. ................... | 345/113 |
| 5,790,111 A | * | 8/1998 | Wood et al. ................ | 345/213 |
| 5,808,689 A | * | 9/1998 | Small ......................... | 348/476 |
| 5,821,948 A | * | 10/1998 | Kawamoto et al. ......... | 345/507 |
| 5,844,629 A | * | 12/1998 | Murray et al. .............. | 348/450 |
| 5,963,200 A | * | 10/1999 | Deering et al. ............. | 345/213 |
| 6,005,634 A | * | 12/1999 | Lam et al. ................... | 348/541 |
| 6,046,737 A | * | 4/2000 | Nakamura ................... | 345/213 |
| 6,091,429 A | * | 7/2000 | Yassaie et al. .............. | 345/546 |
| 6,226,042 B1 | * | 5/2001 | Kondo et al. ............... | 348/488 |
| 6,326,935 B1 | * | 12/2001 | Boger .......................... | 345/12 |
| 6,327,002 B1 | * | 12/2001 | Rinaldi et al. .............. | 345/603 |

* cited by examiner

*Primary Examiner*—Xiao Wu
*Assistant Examiner*—Kevin M. Nguyen
(74) *Attorney, Agent, or Firm*—Procopio, Cory, Hargreaves & Savitch LLP

(57) ABSTRACT

An apparatus and method for detecting the presence of a display device at the output of a video driver utilizes a terminating resistance connected between the output of the video driver and a ground level. A current is driven by the video driver, resulting in a voltage level at the output. A comparator compares the resultant voltage to a reference voltage signal to determine whether the resultant voltage is above or below a predefined threshold. The threshold is chosen as lying between an anticipated resultant voltage for a video driver having a display device connected thereto and an anticipated resultant voltage for a video driver without a display device connected thereto.

5 Claims, 36 Drawing Sheets

VIDEO FORMATS

| MODE | NTSC | NTSC-60Hz | PAL-BDGHI | PAL-N | PAL-Nc | PAL-M | PAL-M60Hz | PAL-60 |
|---|---|---|---|---|---|---|---|---|
| FSC (Hz) | 3,579,545 | 3,579,545 | 4,433,618.75 | 4,433,618.75 | 3,582,056.25 | 3,575,611.88 | 3,575,611.88 | 4,433,619.49 |
| BURST START | 5.3µs | 5.3µs | 5.60µs | 5.60µs | 5.60µs | 5.80µs | 5.80µs | 5.60µs |
| BURST END | 7.82µs | 7.82µs | 7.85µs | 7.85µs | 8.11µs | 8.32µs | 8.32µs | 7.85µs |
| HSYNC WIDTH | 4.70µs | 4.70µs | 4.70µs | 4.70µs | 4.70µs | 4.70µs | 4.70µs | 4.70µs |
| HSYNC FREQUENCY | 63.555µs | 64µs | 64µs | 64 µs | 64µs | 63.555µs | 64µs | 64µs |
| ACTIVE BEGIN | 9.40µs | 9.40µs | 10.5µs | 9.40µs | 10.5µs | 9.40µs | 9.40µs | 10.5µs |
| IMAGE CENTER | 35.667µs | 35.667µs | 36.407µs | 35.667µs | 36.407µs | 35.667µs | 35.667µs | 36.407µs |
| FRONT PORCH | 1.50µs | 1.50µs | 1.50µs | 1.50µs | 1.50µs | 1.50µs | 1.50µs | 1.50µs |

FIG. 2

| CONSTANT VALUES DEPENDENT ON ENCODING MODE | | | | |
|---|---|---|---|---|
| MODES | INTERLACED | | NON-INTERLACED | |
| | PAL | NTSC | PAL | NTSC |
| ALO | 288 | 243 | 288 | 243 |
| TLO | 312.5 | 262.5 | 312 | 262 |
| ATO | 52.0 μs | 52.65556 μs | 52.0 μs | 52.65556 μs |
| TTO | 64.0 μs | 63.55556 μs | 64.0 μs | 63.55556 μs |

FIG. 3

DATA PIN ASSIGNMENTS FOR MULTIPLEXED MODES

| PIN | RISING EDGE OF CLKI | | | FALLING EDGE OF CLKI | | |
|---|---|---|---|---|---|---|
| | 24-BIT RGB MODE | 15/16-BIT RGB MODE | 16-BIT YCrCb MODE | 24-BIT YCrCb MODE | 24-BIT RGB MODE | 15/16-BIT RGB MODE | 16-BIT YCrCb MODE | 24-BIT YCrCb MODE |
| P[11] | G4 | G2 | Cr/Cb7 | Cr7 | R7 | R4 | Y7 | Y7 |
| P[10] | G3 | G1 | Cr/Cb6 | Cr6 | R6 | R3 | Y6 | Y6 |
| P[9] | G2 | G0 | Cr/Cb5 | Cr5 | R5 | R2 | Y5 | Y5 |
| P[8] | B7 | B4 | Cr/Cb4 | Cr4 | R4 | R1 | Y4 | Y4 |
| P[7] | B6 | B3 | Cr/Cb3 | Cr3 | R3 | R0 | Y3 | Y3 |
| P[6] | B5 | B2 | Cr/Cb2 | Cr2 | G7 | G5[1] | Y2 | Y2 |
| P[5] | B4 | B1 | Cr/Cb1 | Cr1 | G6 | G4 | Y1 | Y1 |
| P[4] | B3 | B0 | Cr/Cb0 | Cr0 | G5 | G3 | Y0 | Y0 |
| P[3] | G0 | — | — | Cb7 | R2 | — | — | Cb3 |
| P[2] | B2 | — | — | Cb6 | R1 | — | — | Cb2 |
| P[1] | B1 | — | — | Cb5 | R0 | — | — | Cb1 |
| P[0] | B0 | — | — | Cb4 | G1 | — | — | Cb0 |

NOTE: (1). G5 IS IGNORED IN 15-BIT RGB MODE

FIG. 6

DATA PIN ASSIGNMENTS FOR MULTIPLEXED MODES

| PIN | 24-BIT RGB MODE | 24-BIT YCrCb MODE |
|---|---|---|
| P[23:16] | B[7:0] | Cb[7:0] |
| P[15:8] | G[7:0] | Cr[7:0] |
| P[7:0] | R[7:0] | Cy[7:0] |

FIG. 7

REGISTER BIT MAP

| 8-BIT ADDRESS | D7 | D6 | D5 | D4 | D3 | D2 | D1 | D0 |
|---|---|---|---|---|---|---|---|---|
| 6C | TIMING RESET | RESERVED | | | | | | |
| 6E | HSYNOFFSET[7:0] | | | | | | | |
| 70 | HSYNOFFSET[9:8] | | HSYNWIDTH [5:0] | | | | | |
| 72 | VSYNOFFSET[7:0] | | | | | | | |
| 74 | DATDLY | DATSWP | VSYNOFFSET [10:8] | | | VSYNWIDTH [2:0] | | |
| 76 | H_CLKO[7:0] | | | | | | | |
| 78 | H_ACTIVE[7:0] | | | | | | | |
| 7A | HSYNC_WIDTH[7:0] | | | | | | | |

FIG. 8A

CONTINUED ON PAGE 9

CONTINUED FROM PAGE 8

| 8-BIT ADDRESS | D7 | D6 | D5 | D4 | D3 | D2 | D1 | D0 |
|---|---|---|---|---|---|---|---|---|
| 7C | HBURST_BEGIN[7:0] | | | | | | | |
| 7E | HBURST_END[7:0] | | | | | | | |
| 80 | H_BLANKO[7:0] | | | | | | | |
| 82 | V_BLANKO[7:0] | | | | | | | |
| 84 | V_ACTIVEO[7:0] | | | | | | | |
| 86 | V_ACTIVEO[8] | | RESERVED | H_ACTIVE[9:8] | | H_CLKO[11:8] | | |
| 88 | H_FRACT[7:0] | | | | | | | |
| 8A | H_CLKI[7:0] | | | | | | | |
| 8C | H_BLANKI[7:0] | | | | | | | |
| 8E | RESERVED | | RESERVED | RESERVED | VBLANKDLY | H_BLANKI[8] | H_CLKI[10:8] | |
| 90 | V_LINESI[7:0] | | | | | | | |
| 92 | V_BLANKI[7:0] | | | | | | | |
| 94 | V_ACTIVEI[7:0] | | | | | | | |
| 96 | CLPF[1:0] | | YLPF[1:0] | | V_ACTIVEI[9:8] | | V_LINESI[9:8] | |

FIG. 8A

REGISTER BIT MAP

| 8-BIT ADDRESS | D7 | D6 | D5 | D4 | D3 | D2 | D1 | D0 |
|---|---|---|---|---|---|---|---|---|
| 98 | V_SCALE[7:0] | | | | | | | |
| 9A | H_BLANKO[9:8] | | V_SCALE[13:8] | | | | | |
| 9C | PLL_FRACT[7:0] | | | | | | | |
| 9E | PLL_FRACT[15:8] | | | | | | | |
| A0 | EN_XCLK | BY_PLL | PLL_INT[5:0] | | | | | |
| A2 | RESERVED | ECLIP | PAL_MD | DIS_SCRESET | VSYNC_DUR | 625LINE | SETUP | NI_OUT |
| A4 | SYNC_AMP[7:0] | | | | | | | |
| A6 | BST_AMP[7:0] | | | | | | | |
| A8 | MCR[7:0] | | | | | | | |
| AA | MCB[7:0] | | | | | | | |
| AC | MY[7:0] | | | | | | | |
| AE | MSC[7:0] | | | | | | | |
| B0 | MSC[15:8] | | | | | | | |
| B2 | MSC[23:16] | | | | | | | |
| B4 | MSC[31:24] | | | | | | | |
| B6 | PHASE_OFF[7:0] | | | | | | | |
| B8 | | | | | | EN_PINCFG | CONFIG[2:0] | |
| BA | SRESET | CHECK_STAT | SLAVER | DACOFF | | RESERVED | DACDISC | DACDISB | DACDISA |
| BC | CCF2B1[7:0] | | | | | | | |
| BE | CCF2B2[7:0] | | | | | | | |

FIG. 8B    CONTINUED ON PAGE 11

CONTINUED FROM PAGE 10

| 8-BIT ADDRESS | D7 | D6 | D5 | D4 | D3 | D2 | D1 | D0 |
|---|---|---|---|---|---|---|---|---|
| C0 | CCF1B1[7:0] | | | | | | | |
| C2 | CCF1B2[7:0] | | | | | | | |
| C4 | ESTATUS[1:0] | | ECCF2 | ECCF1 | ECCGATE | ECBAR | DCHROMA | EN_OUT |
| C6 | EN_BLANKO | EN_DOT | FIELDI | VSYNCI | HSYNCI | IN_MODE[2:0] | | |
| C8 | DIS_YFLPF | DIS_FFILT | F_SELC[2:0] | | | F_SELY[2:0] | | |
| CA | DIS_GMUSHY | DIS_GMSHY | YCORING[2:0] | | | YATTENUATE[2:0] | | |
| CC | DIS_GMUSHC | DIS_GMSHC | CCORING[2:0] | | | CATTENUATE[2:0] | | |
| CE | RESERVED | | OUT_MUXC[1:0] | | OUT_MUXB[1:0] | | OUT_MUXA[1:0] | |
| D0 | CCR_START[7:0] | | | | | | | |
| D2 | CC_ADD[7:0] | | | | | | | |
| D4 | MODE2X | DIV2 | EN_ASYNC | CCR_START[8] | CC_ADD[11:8] | | | |
| D6 | RESERVED | RESERVED | RESERVED | RESERVED | RESERVED | OUT_MODE[1:0] | | LUMADLY[1:0] |
| D8 | RESERVED | | | | | | | |

FIG. 8B

PROGRAMMING DETAIL

| BIT/ REGISTER NAMES | BIT/REGISTER DEFINITION |
|---|---|
| H_CLKO[11:0] | NUMBER OF OUTPUT CLKS/LINE |
| H_ACTIVE[9:0] | NUMBER OF ACTIVE INPUT AND OUTPUT PIXELS |
| HSYNC_WIDTH[7:0] | ANALOG SYNC WIDTH IN CLOCKS |
| HBURST_BEGIN[7:0] | BEGINNING OF BURST 50% POINT IN NUMBER OF CLOCK CYCLES FROM ANALOG HSYNC FALLING EDGE |
| HBURST_END[7:0] | END OF BURST 50% POINT IN NUMBER OF CLOCK CYCLES–128 FROM ANALOG SYNC FALLING EDGE |
| H_BLANKO[9:0] | NUMBER OF OUTPUT CLKS BETWEEN LEADING EDGE OF HORIZONTAL SYNC AND ACTIVE VIDEO |
| V_BLANKO[7:0] | LINE NUMBER OF FIRST ACTIVE LINE (NUMBER OF BLANK LINES + 1) |
| V_ACTIVEO[8:0] | NUMBER OF ACTIVE OUTPUT LINES/FIELD |
| H_FRACT[7:0] | FRACTIONAL NUMBER OF INPUT CLOCKS PER LINE |
| H_CLKI[10:0] | NUMBER OF CLOCKS PER LINE BETWEEN SUCCESSIVE HSYNC* EDGES |
| H_BLANKI[8:0] | NUMBER OF INPUT PIXELS BETWEEN HSYNC* LEADING EDGE AND FIRST ACTIVE PIXEL |
| VBLANKDLY | IF SET, THE EFFECTIVE VERTICAL BLANKING VALUE IN THE SECOND FIELD IS V_BLANKI+1 |
| V_LINESI[9:0] | NUMBER OF VERTICAL INPUT LINES |
| V_BLANKI[7:0] | NUMBER OF INPUT LINES BETWEEN VSYNC* LEADING AND FIRST ACTIVE LINE |
| V_ACTIVEI[9:0] | NUMBER OF ACTIVE INPUT LINES |
| CLPF[1:0] | CHROMA HORIZONTAL LOW PASS FILTER<br>00 = BYPASS<br>01 = RESERVED |

FIG. 9A  CONTINUED ON PAGE 13

CONTINUED FROM PAGE 12

| | |
|---|---|
| | 10 = CHROMA HORIZONTAL LPF2 |
| | 11 = CHROMA HORIZONTAL LPF3 |
| YLPF[1:0] | LUMA POST-FLICKERFILTER/SCALER HORIZONTAL LOW PASS FILTER |
| | 00 = BYPASS |
| | 01 = LUMA HORIZONTAL LPF1 |
| | 10 = LUMA HORIZONTAL LPF2 |
| | 11 = LUMA HORIZONTAL LPF3 |
| V_SCALE[13:0] | VERTICAL SCALING COEFFICIENT |
| PLL_FRACT[15:0] | FRACTIONAL PORTION OF PLL MULTIPLIER |
| PLL_INT[5:0] | INTEGER PORTION OF PLL MULTIPLIER |
| EN_XCLK | 0 = ENCODER GENERATES PIXEL CLOCK |
| | 1 = USE CLKI PIN AS PIXEL CLOCK SOURCE |
| BY_PLL | 0 = USE PLL |
| | 1 = BYPASS PLL (ENCODER CLOCK IS CRYSTAL FREQUENCY) |
| RESERVED | RESERVED FOR FUTURE SOFTWARE COMPATIBILITY: SHOULD BE SET TO ZERO FOR NORMAL OPERATION |
| ECLIP | 0 = NORMAL OPERATION |
| | 1 = ENABLE CLIPPING: DAC VALUES LESS THAN 31 ARE MADE 31 |

FIG. 9A

PROGRAMMING DETAIL

| BIT/ REGISTER NAMES | BIT/REGISTER DEFINITION |
|---|---|
| PAL_MD | VIDEO OUTPUT SWITCH BIT. IF PAL PIN = 0, THIS CONTROLS ANALOG OUTPUT FORMAT<br>0 = CHANGES VIDEO OUTPUT TO NTSC MODE<br>1 = CHANGES VIDEO OUTPUT TO PAL MODE (EVEN IF PAL PIN = 0) |
| DIS_SCRESET | 0 = NORMAL OPERATION. THE SUBCARRIER PHASE IS RESET TO 0 AT THE BEGINNING OF EACH COLOR FIELD SEQUENCE<br>1 = DISABLES SUBCARRIER RESET EVENT AT BEGINNING OF FIELD SEQUENCE |
| VSYNC_DUR | 0 = GENERATES 2.5-LINE VSYNC ANALOG OUTPUT<br>1 = GENERATES 3-LINE VSYNC ANALOG OUTPUT |
| 625LINE | 0 = 525-LINE FORMAT<br>1 = 625-LINE FORMAT |
| SETUP | 1 = SETUP ON. THE 7.5-IRE SETUP IS ENABLED FOR ACTIVE VIDEO LINES.<br>0 = SETUP OFF. THE 7.5-IRE SETUP IS DISABLED FOR ACTIVE VIDEO LINES. |
| NI_OUT | 0 = INTERLACED ANALOG VIDEO OUTPUT<br>1 = NONINTERLACED ANALOG VIDEO OUTPUT |
| SYNC_AMP[7:0] | MULTIPLICATION FACTOR FOR SYNC AMPLITUDE |
| BST_AMP[7:0] | BURST AMPLITUDE MULTILICATION FACTOR |
| MCR[7:0] | MULTIPLICATION FACTOR FOR CR (OR R-Y) COMPONENT PRIOR TO SUBCARRIER MODULATION |
| MCB[7:0] | MULTIPLICATION FACTOR FOR CB (OR B-Y) COMPONENT PRIOR TO SUBCARRIER MODULATION |
| MY[7:0] | MULTIPLICATION FACTOR FOR Y COMPONENT |
| MSC[31:0] | SUBCARRIER INCREMENT |

FIG. 9B  CONTINUED ON PAGE 15

CONTINUED FROM PAGE 14

| | |
|---|---|
| PHASE_OFF[7:0] | SUBCARRIER PHASE OFFSET |
| EN_PINCFG | WHEN SET, THIS WILL ENABLE THE AUTO CONFIGURATION TO BE CONTROLLED BY P[23:21]. WHENEVER A CHANGE IS DETECTED ON THESE PINS, THE MODE IS RECONFIGURED |
| CONFIG[2:0] | THIS FIELD DETERMINES THE CONFIGURATION FOR THE AUTOMATIC CONFIGURATION PROCESS<br>000 = NTSC 640X480 RGB INPUT<br>001 = PAL 640X480 RGB INPUT<br>010 = NTSC 800X600 RGB INPUT<br>011 = PAL 800X600 RGB INPUT<br>100 = NTSC 640X480 YCrCb INPUT<br>101 = PAL 640X480 YCrCb INPUT<br>110 = NTSC 800X600 YCrCb INPUT<br>111 = PAL 800X600 YCrCb INPUT |
| SRESET | WRITING A 1 TO THIS BIT PERFORMS A SOFTWARE RESET: ALL REGISTERS ARE RESET TO 0s UNLESS THE CONFIG[2:0] FIELD IS NON-0; IN THAT CASE, THE AUTOMATIC CONFIGURATION PROCESS IS BEGUN AND THE BUSY STATUS BIT IS SET. THIS BIT IS AUTOMATICALLY CLEARED. |
| CHECK_STAT | WRITING A 1 TO THIS BIT CHECKS THE STATUS OF THE MONITOR CONNECTIONS AT THE DAC OUTPUT. THIS IS ALSO AUTOMATICALLY PERFORMED ON ANY RESET CONDITION, INCLUDING A SOFTWARE RESET. THIS BIT IS AUTOMATICALLY CLEARED. |
| DACOFF | 0 = NORMAL OPERATION<br>1 = DISABLES DAC OUTPUT CURRENT AND INTERNAL VOLTAGE REFERENCE. THIS WILL LIMIT POWER CONSUMPTION TO JUST THE DIGITAL CIRCUITS. |
| DACDISC | 0 = NORMAL OPERATION<br>1 = DISABLES DAC OUTPUT. CURRENT IS SET TO 0; OUTPUT WILL GO TO 0 V. |

FIG. 9B

PROGRAMMING DETAIL

| BIT/REGISTER NAMES | BIT/REGISTER DEFINITION |
|---|---|
| DACDISB | 0 = NORMAL OPERATION<br>1 = DISABLES DACB OUTPUT. CURRENT IS SET TO 0: OUTPUT WILL GO TO 0 V. |
| DACDISA | 0 = NORMAL OPERATION<br>1 = DISABLES DACA OUTPUT. CURRENT IS SET TO 0: OUTPUT WILL GO TO 0 V. |
| CCF2B1[7:0] | THIS IS THE FIRST BYTE OF CLOSED-CAPTION INFORMATION FOR THE EVEN FIELD, LINE 284 FOR NTSC OR LINE 335 FOR PAL. DATA IS ENCODED LSB FIRST. |
| CCF2B2[7:0] | THIS IS THE SECOND BYTE OF CLOSED-CAPTION INFORMATION FOR THE EVEN FIELD, LINE 284 FOR NTSC OR LINE 335 FOR PAL. DATA IS ENCODED LSB FIRST. |
| CCF1B1[7:0] | THIS IS THE FIRST BYTE OF CLOSED-CAPTION INFORMATION FOR THE ODD FIELD, LINE 21 FOR NTSC OR LINE 22 FOR PAL. DATA IS ENCODED LSB FIRST. |
| CCF1B2[7:0] | THIS IS THE SECOND BYTE OF CLOSED-CAPTION INFORMATIN FOR THE ODD FIELD, LINE 21 FOR NTSC OR LINE 22 FOR PAL. DATA IS ENCODED LSB FIRST. |
| ESTATUS[1:0] | SERIAL READ-BACK STATUS BIT SELECTION (SEE TABLE 2-2.) |

FIG. 9C    CONTINUED ON PAGE 17

CONTINUED FROM PAGE 16

| | |
|---|---|
| ECCF2 | 0 = DISABLES CLOSED-CAPTION ENCODING ON FIELD 2.<br>1 = ENABLES CLOSED-CAPTION ENCODING ON FIELD 2. |
| ECCF1 | 0 = DISABLES CLOSED-CAPTION ENCODING ON FIELD 1.<br>1 = ENABLES CLOSED-CAPTION ENCODING ON FIELD 1. |
| ECCGATE | 0 = NORMAL CLOSED-CAPTION ENCODING.<br>1 = ENABLES CLOSED-CAPTION ENCODING CONSTRAINTS. AFTER ENCODING, FUTURE ENCODING IS DISABLED UNTIL A COMPLETE PAIR OF NEW DATA BYTES IS RECEIVED. THIS PREVENTS ENCODING OF REDUNDANT OR INCOMPLETE DATA. |
| ECBAR | 0 = NORMAL OPERATION<br>1 = ENABLES COLOR BARS. |
| DCHROMA | 0 = NORMAL OPERATION<br>1 = BLANK CHROMA |
| EN_OUT | 0 = THREE-STATES ALL OUTPUTS.<br>1 = ALLOWS OUTPUTS TO BE ENABLED (DEPENDING UPON EN_BLANKO REGISTER BIT AND SLAVE PIN). |

CONTINUED ON PAGE 18

FIG. 9C

CONTINUED FROM PAGE 17

| EN_BLANKO | ENABLES BLANK* PIN AS AN OUTPUT. |
|---|---|
| EN_DOT | ENABLES DOT CLOCK SYNCHRONIZATION ON BLANK* PIN. |
| FIELDI | 0 = LOGICAL 1 ON FIELD INDICATES AN EVEN FIELD.<br>1 = LOGICAL 1 ON FIELD INDICATES AN ODD FIELD. |
| VSYNCI | 0 = ACTIVE LOW VSYNC*<br>1 = ACTIVE HIGH VSYNC* |
| HSYNCI | 0 = ACTIVE LOW HSYNC*<br>1 = ACTIVE HIGH HSYNC* |
| IN_MODE[2:0] | FORMAT OF PIXELS AT INPUT OF ENCODER:<br><br>000 = 24-BIT RGB MULTIPLEXED<br>001 = 16-BIT RGB MULTIPLEXED<br>010 = 15-BIT RGB MULTIPLEXED<br>011 = 24-BIT RGB NON-MULTIPLEXED<br>100 = 24-BIT YCrCb MULTIPLEXED<br>101 = 16-BIT YCrCb MULTIPLEXED<br>110 = RESERVED<br>111 = 24-BIT YCrCb NON-MULTIPLEXED |

FIG. 9C

PROGRAMMING DETAIL

| BIT/REGISTER NAMES | BIT/REGISTER DEFINITION |
|---|---|
| DIS_YFLPF | LUMA INITIAL HORIZONTAL LOW PASS FILTER<br><br>0 = ENABLE<br>1 = DISABLE |
| DIS_FFILT | 0 = ENABLE FLICKERFILTER<br>1 = DISABLE FLICKERFILTER |
| F_SELC[2:0] | CHROMA FLICKER FILTER:<br><br>000 = 5 LINE<br>001 = 2 LINE<br>010 = 3 LINE<br>011 = 4 LINE<br>100 = ALTERNATE 5 LINE<br>101 = ALTERNATE 5 LINE<br>110 = ALTERNATE 5 LINE<br>111 = ALTERNATE 5 LINE |

FIG. 9D    CONTINUED ON PAGE 20

CONTINUED FROM PAGE 19

| | |
|---|---|
| F_SELY[2:0] | LUMA FLICKER FILTER:<br><br>000 = 5 LINE<br>001 = 2 LINE<br>010 = 3 LINE<br>011 = 4 LINE<br>100 = ALTERNATE 5 LINE<br>101 = ALTERNATE 5 LINE<br>110 = ALTERNATE 5 LINE<br>111 = ALTERNATE 5 LINE |
| DIS_GMUSHY | 0 = ENABLES LUMA ANTI-PSUEDO GAMMA REMOVAL.<br>1 = DISABLES LUMA ANTI-PSUEDO GAMMA REMOVAL. |
| DIS_GMSHY | 0 = ENABLES LUMA PSUEDO GAMMA REMOVAL.<br>1 = DISABLES LUMA PSUEDO GAMMA REMOVAL. |

FIG. 9D    CONTINUED ON PAGE 21

| | |
|---|---|
| YCORING[2:0] | LUMA CORING:<br><br>000 = BYPASS<br>001 = 1/128 OF RANGE<br>010 = 1/64 OF RANGE<br>011 = 1/32 OF RANGE<br>100 = 1/16 OF RANGE<br>101 = 1/8 OF RANGE<br>110 = 1/4 OF RANGE<br>111 = RESERVED |
| YATTENUATE[2:0] | LUMA ATTENUATION<br><br>000 = 1.0 GAIN (NO ATTENUATION)<br>001 = 15/16 GAIN<br>010 = 7/8 GAIN<br>011 = 3/4 GAIN<br>100 = 1/2 GAIN<br>101 = 1/4 GAIN<br>110 = 1/8 GAIN<br>111 = 0 GAIN (FORCE LUMA TO 0) |
| DIS_GMUSHC | 0 = ENABLES CHROMA ANTI-PSUEDO GAMMA REMOVAL.<br>1 = DISABLES CHROMA ANTI-PSUEDO GAMMA REMOVAL. |

FIG. 9D

PROGRAMMING DETAIL

| BIT/REGISTER NAMES | BIT/REGISTER DEFINITION |
|---|---|
| DIS_GMSHC | 0 = ENABLES CHROMA PSUEDO GAMMA REMOVAL.<br>1 = DISABLES CHROMA PSUEDO GAMMA REMOVAL. |
| CCORING[2:0] | CHROMA CORING:<br>000 = BYPASS<br>001 = 1/128 OF RANGE (+/- 1/256 OF RANGE)<br>010 = 1/64 OF RANGE (+/- 1/128 OF RANGE)<br>011 = 1/32 OF RANGE (+/- 1/64 OF RANGE)<br>100 = 1/16 OF RANGE (+/- 1/32 OF RANGE)<br>101 = 1/8 OF RANGE (+/- 1/16 OF RANGE)<br>110 = 1/4 OF RANGE (+/- 1/8 OF RANGE)<br>111 = RESERVED |

FIG. 9E

CONTINUED ON PAGE 23

CONTINUED FROM PAGE 22

| | |
|---|---|
| CATTENUATE[2:0] | CHROMA ATTENUATION:<br>000 = 1.0 GAIN (NO ATTENUATION)<br>001 = 15/16 GAIN<br>010 = 7/8 GAIN<br>011 = 3/4 GAIN<br>100 = 1/2 GAIN<br>101 = 1/4 GAIN<br>110 = 1/8 GAIN<br>111 = 0 GAIN (FORCE CHROMA TO 0) |
| OUT_MUXA[1:0] | 00 = OUTPUT VIDEO[0] ON DACA<br>01 = OUTPUT VIDEO[1] ON DACA<br>10 = OUTPUT VIDEO[2] ON DACA<br>11 = OUTPUT VIDEO[3] ON DACA |
| OUT_MUXB[1:0] | 00 = OUTPUT VIDEO[0] ON DACB<br>01 = OUTPUT VIDEO[1] ON DACB<br>10 = OUTPUT VIDEO[2] ON DACB<br>11 = OUTPUT VIDEO[3] ON DACB |
| OUT_MUXC[1:0] | 00 = OUTPUT VIDEO[0] ON DACC<br>01 = OUTPUT VIDEO[1] ON DACC<br>10 = OUTPUT VIDEO[2] ON DACC<br>11 = OUTPUT VIDEO[3] ON DACC |

FIG. 9E   CONTINUED ON PAGE 24

CONTINUED FROM PAGE 23

| | |
|---|---|
| CCR_START[8:0] | CLOSED-CAPTIONING CLOCK RUN-IN START IN CLOCK CYCLES FROM LEADING EDGE OF HSYNC* |
| CC_ADD[11:0] | CLOSED-CAPTIONING DTO INCREMENT |
| DIV2 | DIVIDES INPUT PIXEL RATE BY TWO (FOR CCIR601 INTERLACED TIMING INPUT). |
| MODE2X | DIVIDES SELECTED INPUT CLOCK BY TWO (ALLOWS FOR 2X RATHER THAN DOUBLE-EDGE CLOCK INPUT). |
| EN_ASYNC | SET TO 0 FOR NORMAL OPERATION. |
| OUT_MODE[1:0] | 00 = VIDEO[0-3] IS CVBS/ Y/ C/ Y_DLY<br>01 = VIDEO[0-3] IS CVBS_DLY/ Y/ C/ Y_DLY<br>10 = VIDEO[0-3] IS V/ Y/ U/ Y_DLY<br>11 = VIDEO[0-3] IS R/ G/ B/ X (VGA MODE) |
| LUMADLY[1:0] | THIS 2-BIT VALUE CAN BE USED TO PROGRAM THE LUMINANCE DELAY IN PIXELS FOR THE CVBS_DLY AND Y_DLY OUTPUT MODES.<br><br>00 = NO DELAY<br>01 = 1 PIXEL<br>10 = 2 PIXELS<br>11 = 3 PIXELS |

FIG. 9E

TABLE 2-4. PROGRAMMING DETAIL (6 OF 6)

| BIT/ REGISTER NAMES | BIT/REGISTER DEFINITION |
|---|---|
| HSYNOFFSET [9:0] | A 2s-COMPLEMENT NUMBER. THE VALUES RANGE FROM -512 PIXELS TO +511 PIXELS. THIS REGISTER MANIPULATES THE FALLING EDGE POSITION OF THE DIGITAL HSYNC OUTPUT FROM Bt868. THE DEFAULT VALUE IS 0 AND DENOTES THE STANDARD POSITION OF THE HSYNC LEADING EDGE. |
| VSYNOFFSET [10:0] | A 2s-COMPLEMENT NUMBER. THE VALUES RANGE FROM -HCLKI PIXELS TO +HCLKI PIXELS. THIS REGISTER CAUSES THE FALLING EDGE POSITION OF THE Bt868's DIGITAL VSYNC OUTPUT TO OCCUR EARLIER (-VALUE) OR LATER (+) IN TIME COMPARED TO THE STANDARD POSITION FOR NTSC OR PAL. THE DEFAULT VALUE IS 0 AND DENOTES THE STANDARD POSITION OF THE VSYNC LEADING EDGE. |
| HSYNWIDTH [5:0] | CONTROLS THE DURATION/WIDTH OF THE DIGITAL HSYNC OUTPUT PULSE. VALUE WILL BE HEXADECIMAL AND ITS UNITS ARE IN TERMS OF PIXELS. A VALUE OF 0 IS A DISALLOWED CONDITION. THE ACCEPTABLE RANGE IS 2 PIXELS TO 3F PIXELS (=63 DECIMAL). THE DEFAULT VALUE IS 2. |
| VSYNWIDTH [2:0] | CONTROLS THE WIDTH OF THE VSYNC OUTPUT PULSE. DENOTES THE NUMBER OF LINES THE VSYNC DIGITAL SIGNAL REMAINS LOW ON FIELD TRANSITIONS. VALUE WILL BE HEXADECIMAL VALUE AND ITS UNITS ARE IN TERMS OF LINES. A VALUE OF 0 IS A DISALLOWED CONDITION. THE ACCEPTABLE RANGE IS 1 LINE TO $(2^3-1)$ LINES. THE DEFAULT VALUE IS 1. |

FIG. 9F CONTINUED ON PAGE 26

CONTINUED FROM PAGE 25

| DATDLY | DELAYS THE FALLING EDGE PIXEL DATA BY 1 FULL CLOCK PERIOD WHEN THE FALLING EDGE DATA PRECEDES THE RISING EDGE DATA. ENSURES THAT THE Bt868 MOVES THE FALLING EDGE DATA AFTER THE RISING EDGE DATA. THE CORRECT SEQUENCE OF RISING EDGE DATA/FALLING EDGE DATA/RISING EDGE DATA WILL THEN BE ENCODED BY BUTE0. THE DEFAULT VALUE FOR THIS BIT IS 0 BECAUSE MOST GRAPHICS CONTROLLERS ALREADY TRANSMIT DATA IN THE EXPECTED RISING EDGE DATA/FALLING EDGE DATA SEQUENCE. |
|---|---|
| DATSWP | SWAPS THE FALLING EDGE PIXEL DATA WITH THE RISING EDGE PIXEL DATA AT THE INPUT OF THE PIXEL PORT. THE DEFAULT VALUE FOR THIS BIT IS 0 WHICH TELLS THE VGA ENCODER TO EXPECT AN ORDER OF RISING EDGE DATA/FALLING EDGE DATA COMING FROM THE GRAPHICS CONTROLLER. |
| NOTE: VSYNWIDTH, HSYNWIDTH, VSYNOFFSET, AND HSYNOFFSET ARE ACTIVE ONLY WHEN THE Bt868/869 IS IN THE MASTER TIMING MODE WHEN THE ENCODER OUTPUTS HSYNC AND VSYNC PULSES. IN THE SLAVE TIMING MODE, THESE REGISTERS ARE IGNORED. VSYN-CWIDTH AND HSYNCWIDTH SHOULD NEVER BE SET TO 0. ||

FIG. 9F

AUTO-CONFIGURATION MODES 0-3—RGB INPUT (1 OF 2)

| REGISTER NAME | MODE 0 NTSC 640x480 [1] CLKO=28.195793 MHz | | MODE 1 PAL 640x480 CLKO=29.500008 MHz | | MODE 2 NTSC 800x600 CLKO=38.769241 MHz | | MODE 3 PAL 800x600 CLKO=36.000000 MHz | |
|---|---|---|---|---|---|---|---|---|
| | DEC | HEX | DEC | HEX | DEC | HEX | DEC | HEX |
| H_CLKO [11:0] | 1792 | 700 | 1888 | 760 | 2464 | 9A0 | 2304 | 900 |
| H_ACTIVE [9:0] | 640 | 280 | 640 | 280 | 800 | 320 | 800 | 320 |
| HSYNC_WIDTH [7:0] | 132 | 84 | 138 | 8A | 182 | B6 | 170 | AA |
| HBURST_BEGIN [7:0] | 150 | 96 | 166 | A6 | 206 | CE | 202 | CA |
| HBURST_END [7:0] | 96 | 60 | 104 | 68 | 180 | B4 | 154 | 9A |
| H_BLANKO [10:0] | 381 | 17D | 449 | 1C1 | 597 | 255 | 525 | 20D |
| V_BLANKO [9:0] | 34 | 22 | 46 | 2E | 32 | 20 | 41 | 29 |
| V_ACTIVEO [8:0] | 212 | D4 | 242 | F2 | 216 | D8 | 252 | FC |
| H_FRACT [7:0] | 0 | 0 | 0 | 0 | 0 | 0 | 0 | 0 |
| H_CLKI [10:0] | 784 | 310 | 944 | 3B0 | 880 | 370 | 960 | 3C0 |
| H_BLANKI [8:0] | 126 | 7E | 266 | 10A | 66 | 42 | 140 | 8C |
| V_BLANK_DLY | 0 | 0 | 0 | 0 | 0 | 0 | 0 | 0 |
| V_LINESI [9:0] | 600 | 258 | 625 | 271 | 735 | 2DF | 750 | 2EE |
| V_BLANKI [7:0] | 75 | 4B | 90 | 5A | 86 | 56 | 95 | 5F |
| V_ACTIVEI [9:0] | 480 | 1E0 | 480 | 1E0 | 600 | 258 | 600 | 258 |

FIG. 10A  CONTINUED ON PAGE 28

CONTINUED FROM PAGE 27

| REGISTER NAME | MODE 0<br>NTSC 640x480 [1]<br>CLKO=28.195793 MHz | | MODE 1<br>PAL 640x480<br>CLKO=29.500008 MHz | | MODE 1<br>PAL 640x480<br>CLKO=29.500008 MHz | | MODE 2<br>NTSC 800x600<br>CLKO=38.769241 MHz | | MODE 3<br>PAL 800x600<br>CLKO=36.000000 MHz | |
|---|---|---|---|---|---|---|---|---|---|---|
| | DEC | HEX | DEC | HEX | | DEC | HEX | DEC | HEX |
| CLPF [1:0] | 0 | 0 | 0 | 0 | | 0 | 0 | 0 | 0 |
| YLPF [1:0] | 3 | 3 | 3 | 3 | | 3 | 3 | 3 | 3 |
| V_SCALE [13:0] | 5266 | 1492 | 4096 | 1000 | | 7373 | 1CCD | 5734 | 1666 |
| PLL_FRACT [15:0] | 34830 | 880E | 7282 | 1C72 | | 15124 | 3814 | 0 | 0 |
| EN_XCLK | 0 | 0 | 0 | 0 | | 0 | 0 | 0 | 0 |
| BY_PLL | 0 | 0 | 0 | 0 | | 0 | 0 | 0 | 0 |
| PLL_INT [5:0] | 12 | C | 13 | D | | 17 | 11 | 16 | 10 |
| EN_SCART | 0 | 0 | 0 | 0 | | 0 | 0 | 0 | 0 |
| ECLIP | 0 | 0 | 0 | 0 | | 0 | 0 | 0 | 0 |
| PAL | 0 | 0 | 1 | 1 | | 0 | 0 | 1 | 1 |
| DIS_SCRESET | 0 | 0 | 0 | 0 | | 0 | 0 | 0 | 0 |
| VSYNC_DUR | 1 | 1 | 1 | 1 | | 1 | 1 | 1 | 1 |
| 625LINE | 0 | 0 | 1 | 1 | | 0 | 0 | 1 | 1 |
| SETUP | 1 | 1 | 0 | 0 | | 1 | 1 | 0 | 0 |
| NI_OUT | 0 | 0 | 0 | 0 | | 0 | 0 | 0 | 0 |
| SYNC_AMP [7:0] | 229 | E5 | 240 | F0 | | 229 | E5 | 240 | F0 |

FIG. 10A

AUTO-CONFIGURATION MODES 0-3—RGB INPUT (2 OF 2)

| REGISTER NAME | MODE 0 NTSC 640x480 (1) CLKO=28.195793 MHz | | MODE 1 PAL 640x480 CLKO=29.500008 MHz | | MODE 2 NTSC 800x600 CLKO=38.769241 MHz | | MODE 3 PAL 800x600 CLKO=36.000000 MHz | |
|---|---|---|---|---|---|---|---|---|
| | DEC | HEX | DEC | HEX | DEC | HEX | DEC | HEX |
| BST_AMP [7:0] | 118 | 76 | 88 | 58 | 116 | 74 | 87 | 57 |
| MCR [7:0] | 121 | 79 | 129 | 81 | 119 | 77 | 128 | 80 |
| MCB [7:0] | 68 | 44 | 73 | 49 | 67 | 43 | 72 | 48 |
| MY [7:0] | 133 | 85 | 140 | 8C | 133 | 85 | 140 | 8C |
| MSC [31:0] | 542559520 | 20800000 | 645499916 | 26798C0C | 396552378 | 17A2E88A | 528951320 | 1F872818 |

NOTES: (1). ASSUMES 13.5 MHz CLK-D FREQUENCY

FIG. 10B

AUTO-CONFIGURATION MODES 4-7—YCrCb INPUT (1 OF 2)

| REGISTER NAME | MODE 4 NTSC 640x480 CLKO=28.195793 MHz | | MODE 5 PAL 640x480 CLKO=29.500008 MHz | | MODE 6 NTSC 800x600 CLKO=38.769241 MHz | | MODE 7 PAL 800x600 CLKO=36.000000 MHz | |
|---|---|---|---|---|---|---|---|---|
| | DEC | HEX | DEC | HEX | DEC | HEX | DEC | HEX |
| H_CLKO [11:0] | 1792 | 700 | 1888 | 760 | 2464 | 9A0 | 2304 | 900 |
| H_ACTIVE [9:0] | 640 | 280 | 640 | 280 | 800 | 320 | 800 | 320 |
| HSYNC_WIDTH [7:0] | 132 | 84 | 138 | 8A | 182 | B6 | 170 | AA |
| HBURST_BEGIN [7:0] | 150 | 96 | 166 | A6 | 206 | CE | 202 | CA |
| HBURST_END [7:0] | 96 | 60 | 103 | 68 | 180 | B4 | 154 | 9A |
| H_BLANKO [10:0] | 381 | 17D | 449 | 1C1 | 597 | 255 | 525 | 20D |
| V_BLANKO [9:0] | 34 | 22 | 46 | 2E | 32 | 20 | 41 | 29 |
| V_ACTIVEO [8:0] | 212 | D4 | 242 | F2 | 216 | D8 | 252 | FC |
| H_FRACT [7:0] | 0 | 0 | 0 | 0 | 0 | 0 | 0 | 0 |
| H_CLKI [10:0] | 784 | 310 | 944 | 3B0 | 880 | 370 | 960 | 3C0 |
| H_BLANKI [8:0] | 126 | 7E | 266 | 10A | 66 | 42 | 140 | 8C |
| V_BLANK_DLY | 0 | 0 | 0 | 0 | 0 | 0 | 0 | 0 |
| V_LINESI [9:0] | 600 | 258 | 625 | 271 | 735 | 2DF | 750 | 2EE |
| V_BLANKI [7:0] | 75 | 4B | 90 | 5A | 86 | 56 | 95 | 5F |
| V_ACTIVEI [9:0] | 480 | 1E0 | 480 | 1E0 | 600 | 258 | 600 | 258 |
| CLPF [1:0] | 0 | 0 | 0 | 0 | 0 | 0 | 0 | 0 |
| YLPF [1:0] | 3 | 3 | 3 | 3 | 3 | 3 | 3 | 3 |
| V_SCALE [13:0] | 5266 | 1492 | 4096 | 1000 | 7373 | 1CCD | 5734 | 1666 |

FIG. 11A

AUTO-CONFIGURATION MODES 4-7—YCrCb INPUT (2 OF 2)

| REGISTER NAME | MODE 4 NTSC 640x480 CLKO=28.195793 MHz | | MODE 5 PAL 640x480 CLKO=29.500008 MHz | | MODE 6 NTSC 800x600 CLKO=38.769241 MHz | | MODE 7 PAL 800x600 CLKO=36.000000 MHz | |
|---|---|---|---|---|---|---|---|---|
| | DEC | HEX | DEC | HEX | DEC | HEX | DEC | HEX |
| PLL_FRACT [15:0] | 34830 | 880E | 7282 | 1C72 | 15124 | 3814 | 0 | 0 |
| EN_XCLK | 0 | 0 | 0 | 0 | 0 | 0 | 0 | 0 |
| BY_PLL | 0 | 0 | 0 | 0 | 0 | 0 | 0 | 0 |
| PLL_INT [5:0] | 12 | C | 13 | D | 17 | 11 | 16 | 10 |
| EN_SCART | 0 | 0 | 0 | 0 | 0 | 0 | 0 | 0 |
| ECLIP | 0 | 0 | 1 | 1 | 0 | 0 | 0 | 0 |
| PAL | 0 | 0 | 1 | 1 | 1 | 1 | 1 | 1 |
| DIS_SCRESET | 0 | 0 | 0 | 0 | 0 | 0 | 0 | 0 |
| VSYNC_DUR | 1 | 1 | 0 | 0 | 0 | 0 | 0 | 0 |
| 625LINE | 0 | 0 | 1 | 1 | 0 | 0 | 1 | 1 |
| SETUP | 1 | 1 | 0 | 0 | 1 | 1 | 0 | 0 |
| NI_OUT | 0 | 0 | 0 | 0 | 0 | 0 | 0 | 0 |
| SYNC_AMP [7:0] | 229 | E5 | 240 | F0 | 229 | E5 | 240 | F0 |
| BST_AMP [7:0] | 118 | 76 | 88 | 58 | 116 | 74 | 87 | 57 |
| MCR [7:0] | 121 | 79 | 129 | 81 | 119 | 77 | 128 | 80 |
| MCB [7:0] | 68 | 44 | 73 | 49 | 67 | 43 | 72 | 48 |
| MY [7:0] | 133 | 85 | 140 | 8C | 133 | 85 | 140 | 8C |
| MSC [31:0] | 545259520 | 20800000 | 645499916 | 26798C0C | 396552378 | 17A2E8BA | 528951320 | 1F872818 |

FIG. 11B

METHOD AND APPARATUS FOR DETECTION OF A VIDEO DISPLAY DEVICE

FIELD OF THE INVENTION

The present invention relates generally to video signals and, more particularly, to a method and apparatus for detecting whether a video output is connected to a monitor or other device.

BACKGROUND OF THE INVENTION

The expanding use of computers for generation and control of entertainment content is giving rise to a need for a means to effectively display computer video output on a standard television. In the home, the television is usually centrally and comfortably located and typically has a larger display than that of a computer monitor, making it attractive for the display of content such as computer video games, Internet web sites and the like. In a business setting, the larger display area of a television is inviting for the display of content such as computer-generated presentations, slides and the like. The video signal format and display generated by a computer, however, differs significantly from the display format and scheme of a television. Moreover, computer monitors are constantly being improved to permit higher resolutions and display of more image information content. Computer users have grown accustomed to these higher resolutions, and wish to duplicate this experience on their televisions. Televisions, however, typically have lower resolutions and utilize a video signal format that complies with stringent video broadcast standards developed nearly fifty years ago. These differing video signal formats and display characteristics have made attainment of an acceptable means for displaying a computer video signal on a television very elusive.

In order to effectively display a computer video signal on a television screen, the computer video signal must be transformed or converted into a television-compatible video signal. This is a complex process involving many issues. While the present invention deals with a particular aspect of this process, stretching or shrinking ("scaling") horizontal lines of computer video data to fit within the horizontal display area of a television, it is useful to review the fundamental steps of a conventional conversion process. These steps include color space conversion; scan rate conversion; horizontal and vertical scaling, and encoding of the composite waveform in accordance with the desired television signal format.

Color space conversion is performed because computers and televisions generally use different "color spaces" for representation and storage of video color data. A color space is a mathematical representation of a set of colors. Computers typically use the RGB (Red, Green, Blue) color space, while televisions use color spaces based on luminance and chrominance values (the YUV and YCbCr color spaces, for example).

The RGB color space is a digital format widely used in computer graphics and imaging. Red, green and blue are the primary additive colors; components of these primary colors can be combined to form any desired color. The RGB color space is the most prevalent choice for computer graphics frame buffers (the memory used to hold images for display) because computer monitors use red, green and blue phosphors to create the desired color. Consequently, using the RGB color space simplifies the architecture and design of the system.

The RGB color space, however, is not always the best choice when dealing with display of "real world" images. The human eye does not always perceive color as a simple addition of red, blue and green, but rather, sometimes as color difference signals. Moreover, processing an image in the RGB color space is not very efficient. In order to modify the intensity or color of a given pixel, for example, all three RGB values must be read from the frame buffer, the intensity or color calculated and the modifications performed, and the new RGB values calculated and written back to the frame buffer. For these and other reasons, broadcast and television standards generally use color spaces employing luminance and chrominance video signals. Luminance, or luma, refers to the black-and-white information in the video signal and chrominance, or chroma, refers to the color information in the video signal. The YUV, YIQ and YCbCr color spaces are luminance and chrominance based.

The YUV color space is the basic analog format used under the NTSC (National Television Standards Committee) composite color video standard, which is used in North America and other parts of the world, as well as under the PAL (Phase Alternation Line) and SECAM (Sequential Couleur Avec Mémoire) standards, which are used in Europe and elsewhere. The YUV space is comprised of luma (Y) and chroma (U and V) components. The luma component is made up of portions of all three RGB color signals, and the chroma components are color difference signals developed by subtracting the luma component from the blue signal (U) and from the red signal (V). A set of basic equations is used to convert between the RGB and YUV color spaces:

$$Y = 0.299R' + 0.587G' + 0.114B';$$

$$U = -0.147R' - 0.289G' + 0.436B'$$
$$\phantom{U} = 0.492(B' - Y); \text{ and}$$

$$V = 0.615R' - 0.515G' - 0.100B'$$
$$\phantom{V} = 0.877(R' - Y).$$

The prime (') symbols in the above equations indicate that the RGB values are gamma-corrected. Gamma correction is necessary to compensate for the nonlinear characteristics of displays using phosphors, such as cathode ray tubes (CRTs). In CRT displays, a small change in voltage when the voltage level is low produces a particular change in the output display brightness level, but this same small change in voltage at a higher voltage level will not produce the same magnitude of change in the brightness output level. This effect, or the difference between what should have been measured and what was measured, is known as gamma. Gamma correction adjusts the intensity output of the CRT so that it is roughly linear.

The YUV format is also advantageous in that a black and white display can be driven with just the Y component. For digital RGB values with a range of zero to 255, Y has a range of zero to 255, U a range of zero to ±112 and V a range of zero to ±157.

The YIQ and YCbCr color spaces are derived from the YUV color space and are optionally used by the NTSC composite color video standard. In the YIQ color space, the "I" stands for "in-phase" and the "Q" for "quadrature", which is the modulation method used to transmit the color information. I and Q are modulated (one modulator is driven by the subcarrier at sine phase; the other modulator is driven by the subcarrier at cosine phase) and added together to form the composite chrominance signal. For digital RGB values with a range of zero to 255, Y has a range of zero to 255, I has a range of zero to ±152, and Q has a range of zero to ±134. The YCbCr color space is a digital component format developed as part of Recommendation ITU-R BT.601 during the development of a worldwide digital component video standard. It is essentially a scaled and offset version of the YUV color space. Y is defined to have a nominal range of 16 to 235; and Cb and Cr are defined to have a range of 16 to 240, with 128 equal to zero.

Another fundamental step in conversion of computer video signals to television video signals is scan rate conversion. Both computers and televisions utilize CRTs having electron guns that produce an electron beam. The beam is attracted to phosphors on the face of the CRT, activating the phosphors and causing them to emit red, green or blue light. The electron beam begins at the top left of the CRT and scans from left to right across the screen, illuminating pixels (which are comprised of the activated phosphors) in the process. Hence, the electron beam is effectively drawing horizontal lines of video, one pixel at a time.

The horizontal scan rate is the number of horizontal lines drawn per second by the electron beam. The horizontal scan rate of a computer monitor is often twice as fast as that of a television monitor. The horizontal scan rate of a computer monitor is typically in the range of 24 to 65 kHz (24,000 to 65,000 horizontal lines drawn per second); and workstations used in business and industry may have horizontal scan rates exceeding 100 kHz. The horizontal scan rate of a television monitor, by contrast, is only about 15 kHz (15,000 horizontal lines drawn per second). Television broadcast standards specify exact horizontal scan rates that must be strictly adhered to; the NTSC horizontal scan rate is 15.75 kHz and the PAL horizontal scan rate is 15.625 kHz.

When the electron beam reaches the bottom of the display, one frame of video has been completed. The number of frames completed by the beam per second, or the number of times that the frame has been "refreshed", is the vertical scan, frame or "refresh" rate. Again, the vertical scan rates of computer monitors are usually much higher than those of television monitors: a television monitor has a frame rate of approximately 30 Hz, while computer monitors have refresh rates of 75 Hz or more.

A VGA (Video Graphics Array, a widely used computer display standard) source, such as a computer, scans out a video display in a "noninterlaced" fashion. That is, all of the lines in a frame are scanned out sequentially, one right after the other. The entire image is drawn on the screen in one pass from top to bottom.

A television display, by contrast, uses an "interlaced" format. Each frame of video is scanned out as two fields that are separated temporally and offset spatially in the vertical direction. Each field is drawn on the screen consecutively and in alternating fashion—first one field, then the other. Essentially, an image is drawn in two top-to-bottom passes: the first pass draws the "odd" lines (the first field) and the second pass draws the "even" lines (the second field). It follows that the number of lines in a field is one-half the number of lines in a frame. In NTSC, there are 262.5 lines per field (525 lines per frame), and in PAL, there are 312.5 lines per field (625 lines per frame).

An interlaced television display format is utilized because of the relatively slow frame rate of a television, which as mentioned above, is approximately 30 Hz. A television screen updated at only 30 frames per second will cause noticeable flicker, that is, the image will begin to fade before the next one is drawn on to the screen. Flicker is similar to the effect produced by an old fluorescent light fixture. By using two interlaced fields, each containing one-half of the information that makes up the frame and each field being drawn on the screen consecutively, the field update rate is 60 fields per second. At this higher rate, the eye blends everything together into a smooth, continuous motion. Again, under the television broadcast standards, there are exact field rates that must be strictly adhered to: 59.94 Hz for NTSC and 50 Hz for PAL.

The RGB pixel data, after being converted into the YUV, YCbCr or YIQ color space, must be encoded into a composite color video waveform recognizable by the television. The composite waveform contains a number of specifically placed and timed video and control signals. These include the active video signal; the color burst waveform; the horizontal and vertical sync pulses; and the horizontal and vertical blanking intervals. The active video signal contains the encoded luminance and chrominance data for the image that is to be displayed on the screen. The color burst waveform provides the decoder with a reference for decoding the chrominance information contained in the active video signal. The horizontal and vertical sync pulses are control signals that signal to the decoder the start of new horizontal lines and new frames. The blanking intervals signal the decoder to shut off the electron beam while it is being retraced from the right edge to the left edge of the display, or from the bottom to the top of the display. Each of these signals is combined into one composite video waveform that is transmitted to the television on a one-wire connection.

The composite video waveform must be encoded in strict accordance with the applicable broadcast standard, such as NTSC or PAL. These standards specify important timing parameters such as the horizontal and vertical sync pulse widths, the rise and fall times of the pulses, and the position and number of cycles in the color burst. These timing parameters should not be substantially altered while encoding the waveform. Numerous problems can result from even slightly inaccurate timing. Errors in the pulse widths can lead to picture break up. Errors in the rise and fall times can make it difficult for the television receiving equipment to lock to the signals.

A composite color video waveform 100 adhering to the NTSC standard is illustrated in FIG. 1. Waveform 100 includes a horizontal blanking interval 102 that extends between active video signals 104 and 106 (only portions of signals 104 and 106 are illustrated. The duration of waveform 100, including one complete active video signal for one horizontal line of video and one horizontal blanking interval, is 63.555 $\mu$s. Stated another way, a horizontal sync pulse occurs once every 63.555 $\mu$s.

Active video signals 104 and 106 contain the luminance and chrominance display information for adjacent horizontal lines of video N and N+1. The luminance is the monochrome component of the signal containing brightness and contrast information, and chrominance is the color component, containing hue and saturation information. The hue and saturation values are transmitted on a color subcarrier wave located within a specific frequency band (3.58 MHz) of the luminance signal. By arranging scanning frequencies to be rigidly tied to the color subcarrier frequency, the hue and saturation components of the chrominance signal are recoverable from the luminance signal. The active video signals range in amplitude from 100 IRE (white) to 7.5 IRE (black). An IRE unit is an arbitrary unit used to describe the amplitude characteristics of a video signal. One IRE corresponds to approximately 7.14 mV. The duration of the active video signal under NTSC is 52.66 μs. The active video signal starts 9.40 μs after the falling edge of the horizontal sync pulse.

During the horizontal blanking interval, the video signal is at the blank level so as not to display the electron beam as it sweeps back from the right to the left side of the screen. The duration of blanking interval 102 is approximately 10.9 μs. Defined within blanking interval 102 is horizontal sync pulse 108 and color burst waveform 110. Horizontal sync pulse 104 signals the beginning of a new horizontal scan line. It is the maximum negative excursion of the composite waveform; approximately −40.0 IRE. As with the other portions of the waveform, sync pulse 108 has rigidly defined parameters. It has a length of 4.70 μs, a drop time (from −40.0 IRE to 0 IRE) of 138 ns and a rise time of 137 ns. The falling edge of the horizontal sync pulse signals to the decoder that a new horizontal line is starting, and the rising edge signals that the color burst waveform is coming. The flat portion 112 of the waveform positioned between the end of active video signal 104 and the beginning of sync pulse 108 is at the blanking level (O IRE) and is often referred to as the "front porch." It has a duration of 1.50 μs.

Color burst waveform 110 follows horizontal sync pulse 108. Color burst waveform 110 serves as a reference for the chrominance signals that are phase modulated and encoded in the active video signal (at the subcarrier frequency of 3.58 MHz). It consists of a nine-cycle sine wave at the subcarrier frequency and at a specific phase. The decoder determines the proper color of the active video from the phase relationship between the color burst waveform and the modulated chrominance signals. Color burst waveform 110 starts 5.3 μs after the horizontal sync pulse falling edge and ends 7.82 seconds after the sync pulse falling edge.

Color burst waveform 110 is positioned on a portion 114 of waveform 100 that extends from the rising edge of horizontal sync pulse 108 to the beginning of active video signal 106. This portion of waveform 100 is often referred to as the "back porch." Back porch 114 is at the blanking level and has a duration of 4.39 μs. The portion 116 of back porch 114 extending between the rising edge of horizontal sync pulse 108 and the start of color burst waveform 110 is sometimes referred to as the "breezeway" and has a duration of 0.5 μs. This time slot gives the decoder time to recover and prepare for detection of the color burst waveform.

The final component of the composite waveform is the vertical sync, which is not illustrated in FIG. 1. The vertical sync occurs every 525 lines for NTSC, as a sequence of pulses, and signals the decoder that a new frame is about to begin.

FIG. 2 is a table that sets forth important timing parameters for NTSC and other common video broadcast formats. These parameters include the subcarrier frequency, the color burst waveform starting and ending times, the width and frequency of the horizontal sync (HSYNC) pulse, the starting time of the active video signal and the timing of the active video image center; and the length of the front porch. FIG. 3 is a table that lists constant values that are dependent on the video output format. These values include the target active lines per output field (ALO); total lines per output field (TLO); the active time per output line (ATO); and the total time per output line (TTO)

The final fundamental issue, horizontal and vertical scaling, arises from the differences in display resolution between computer and television monitors. Resolution is the basic measurement of how much information is on the screen. Resolution is described by a first number representing horizontal resolution (total number of pixels in one horizontal scan line) and a second number representing vertical resolution (total number of horizontal lines down the screen). The typical resolution of a computer monitor is, on the lower end of the scale, 800×600, and may range upwards of 1280×1024. The standard NTSC resolution, by contrast, is only 640×480. Hence, vertical scaling is the process of making the 600 lines (or more) displayed by a computer fit within the television vertical line resolution; and horizontal scaling is the process of making the 800 pixels (or more) per horizontal line displayed by a computer fit within the television horizontal resolution.

In addition to resolving resolution differences, horizontal and vertical scaling helps to counter overscan in the television display. The electron gun in a television set typically overscans the edges of the viewable display area by five to fifteen percent, causing the image to bleed off of the edges in all directions. Overscan is not typically a significant problem when broadcast or recorded signals are displayed on the television, because the viewer usually has no knowledge of the source material. Overscan can, however, pose serious problems when computer-generated video data is displayed on a television. Critical information, such as menus or tool bars, for example, may be lost outside of the television viewable area.

In determining an appropriate amount of vertical filtering or scaling, flicker can also be taken into account. In a computer-generated image, there are frequently abrupt transitions from one scan line to the next. Even at the NTSC scan rate of 60 Hz, the human eye can detect these transitions and scan lines may be seen flashing individually every 1/30 of a second. Vertical or flicker filtering is a technique employed to remove flicker from computer-generated video displayed on a television. A vertical filter averages adjacent scan lines to soften the transition between dark and light lines and to produce lines with less sharply defined contrasts. One common filter, for example, produces a television line by adding one quarter of the current line, two quarters of the previous line and one quarter of the line before that. This is called a "1-2-1" or a "¼-½-¼" filter.

Horizontal scaling has traditionally been achieved by adjusting the number of pixels encoded into the active video signal such that for a given clock rate, the pixels exactly fill the viewable image area of the television. The video data must also fit within the time allotted by the applicable broadcast standard for the active video signal. Under the NTSC standard, for example, the video data can occupy a maximum of 52 μs.

As mentioned above, overscan reduces the actual display time to 44–50 μs. The standard encoder clock rate of 13.5 MHz, for a computer monitor resolution of 640 pixels, yields a display time of 47 μs. This is effective so long as the amount of overscan does not exceed ten percent and the horizontal resolution of the computer video is not greater than 640 pixels.

To display an image having a horizontal resolution of more than 640 pixels, or to accommodate overscan of greater than ten percent, the number of pixels encoded into the composite video waveform is scaled or adjusted to fit within the viewable area. This process is also known as sample rate conversion. An incoming horizontal resolution of 800 pixels, for example, must be scaled down to 640 pixels prior to encoding in order to yield an active video signal having a length of 47 μs at a clock rate of 13.5 MHz. The simplest form of horizontal downscaling is pixel dropping, in which (m) out of every (n) pixels is thrown away. Similarly, horizontal upscaling (in situations where the incoming horizontal resolution is less than the television resolution) is accomplished by duplicating (m) out of every (n) pixels. Pixel dropping (or duplicating) is a crude method of scaling that tremendously impacts resolution and invariably introduces artifacts (blemishes, noise and other physical disruptions) into the image.

Another approach for accomplishing scaling is through interpolation or averaging of adjacent pixels. Various algorithms for interpolation scaling are well known in the art. Scaling via interpolation or averaging improves the video quality relative to simple pixel dropping, but still involves a loss of resolution and artifact generation. Video quality generally depends on the complexity of the algorithm used. Significant amounts of hardware and/or memory are required to implement the more complex algorithms.

SUMMARY OF THE INVENTION

The present invention is directed toward a detection device that can be provided to enable a video device such as, for example, a video encoder to detect the presence of a monitor at one or more of its output ports. According to this aspect of the invention, a termination resistance is provided at each output driver of each output port. A current level is driven by the output driver and the resultant voltage is compared to a reference voltage. The reference voltage is chosen such that it lies between a maximum and minimum resulting voltage depending on whether the output is terminated to a monitor. As such, the output of the comparator provides an indication of whether a monitor is connected to the output port of the video driver.

In one embodiment of the present invention, an apparatus for detecting the presence of a display device at the output of a video driver is provided. The apparatus includes a terminating resistance connected between the output of the video driver and a ground level; an output connector coupled to the output of the video driver and configured to accept connection of a display device; and a comparator, having a first input connected to the output of the video driver and a second input connected to a reference voltage signal, and an output; wherein an output current from the video driver results in a voltage level at the first input of the comparator, the voltage level varying depending on whether or not the display device is connected to the output connector, thereby causing the output of the comparator to indicate whether the display device is connected.

In another embodiment of the present invention, the apparatus further includes a second terminating resistance connected between an output of a second video driver and a ground level; a second output connector coupled to the output of the second video driver and configured to accept connection of a display device; a second comparator, having a first input connected to the output of the second video driver and a second input connected to a reference voltage signal, and an output, wherein an output current from the second video driver results in a voltage level at the first input of the second comparator, the voltage level varying depending on whether or not the display device is connected to the output of the second video driver, thereby causing the output of the second comparator to indicate whether the display device is connected; a third terminating resistance connected between an output of a third video driver and a ground level; a third output connector coupled to the output of the third video driver and configured to accept connection of a display device; and a third comparator, having a first input connected to the output of the third video driver and a third input connected to a reference voltage signal, and an output, wherein an output current from the third video driver results in a voltage level at the first input of the third comparator, the voltage level varying depending on whether or not the display device is connected to the output of the third video driver, thereby causing the output of the third comparator to indicate whether the display device is connected.

In yet another embodiment of this invention, an apparatus for detecting the type of a display device connected at the output of a video device having three video drivers is provided and includes a circuit associated with each of the video drivers for detecting the presence of a display termination at each of the video driver outputs, each circuit including: a terminating resistance connected between the output of the video driver and a ground level, an output connector coupled to the output of the video driver and configured to accept connection of a display device, and a comparator, having a first input connected to the output of the video driver and a second input connected to a reference voltage signal, and an output, wherein an output current from the video driver results in a voltage level at the first input of the comparator, the voltage level varying depending on whether or not a display device input is connected to the output connector, thereby causing the output of the comparator to indicate whether the display device is connected; and means for detecting the comparator output of each circuit to determine whether a display device is connected to each associated video driver and to thereby determine the type of display device connected to the video processor.

In still another embodiment of the invention, a method for determining whether a display device is connected at the output of a video driver, includes providing a terminating resistance at the output of the video driver, independently of whether a display device is connected, driving a current level at the output of the video driver, and comparing a resultant voltage at the output of the video driver with a reference voltage level to determine whether a display device is connected to the output of the video driver.

In yet another embodiment of the invention, a method for detecting the type of a display device connected at the output of a video device having three video drivers includes driving a current level at the output of each of the three video drivers, the outputs each coupled to an output connector and a terminating resistance; measuring a voltage level at the output of each of the three video drivers; comparing the measured voltage level to a reference voltage level, wherein the reference voltage level is between a first voltage level resulting from the current across the terminating resistance, and a second voltage level resulting from the current across a combination of the terminating resistance and a resistance of a display device connected to the output connector; and determining the type of display device connected based on the results of the comparing for each of the three video drivers.

Further features and advantages of the invention, as well as the structure and operation of particular embodiments of the invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements.

FIG. 2 is a table listing timing parameters for various video output formats;

FIG. 3 is a table listing constant values that are dependent on the video output format;

FIG. 4 is a functional block diagram of a device for converting video formats according to the present invention;

FIG. 5b is a detailed block diagram of a waveform timing and control portion of FIG. 5a;

FIG. 6 is a table that summarizes external data pin assignments for multiplexed pixel input to the device of FIG. 4;

FIG. 7 is a table that summarizes external data pin assignments for non-multiplexed pixel input to the device of FIG. 4;

FIGS. 8a–8b are tables depicting a register bit map for the device of FIG. 4;

FIGS. 9a–9f are tables summarizing the function and content of the registers depicted in FIGS. 8a–8b;

FIGS. 10a–10b are tables summarizing the register settings for RGB 640×480 or 800×600 input and NTSC or PAL composite video output;

FIGS. 11a–11b are tables summarizing the register settings for YCrCb 640×480 or 800×600 input and NTSC or PAL composite video output;

FIG. 12 is a diagram showing the frequency response of an upsampler incorporated in the encoder of FIG. 5a; and FIG. 13 is a diagram showing the frequency response of a low pass filter incorporated in the encoder of FIG. 5a.

DETAILED DESCRIPTION OF PREFERRED EMBODIMENTS

Figure 1:
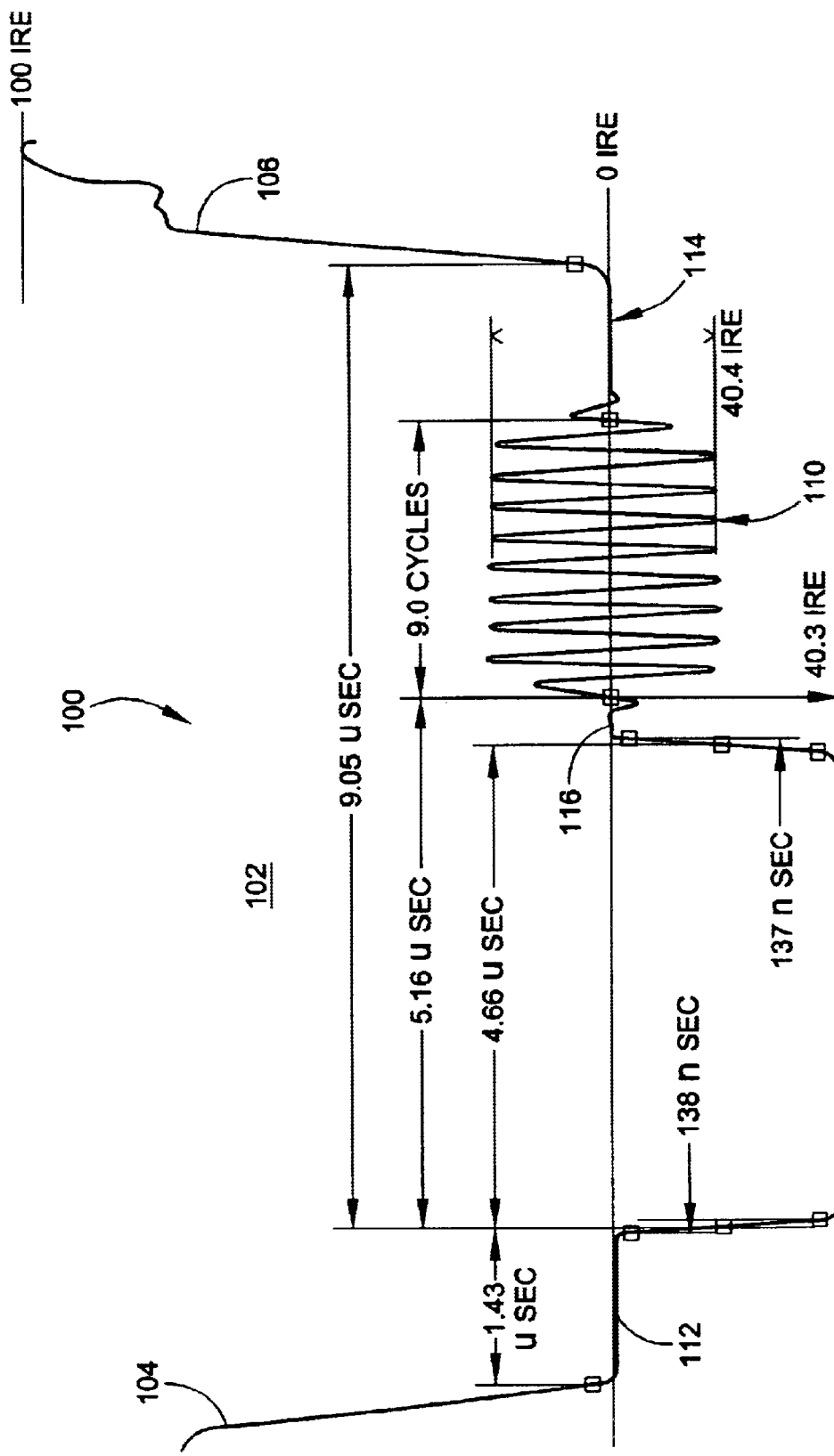
FIG. 1 is a diagram of an NTSC-formatted composite video waveform.
Figures 4, 5B:
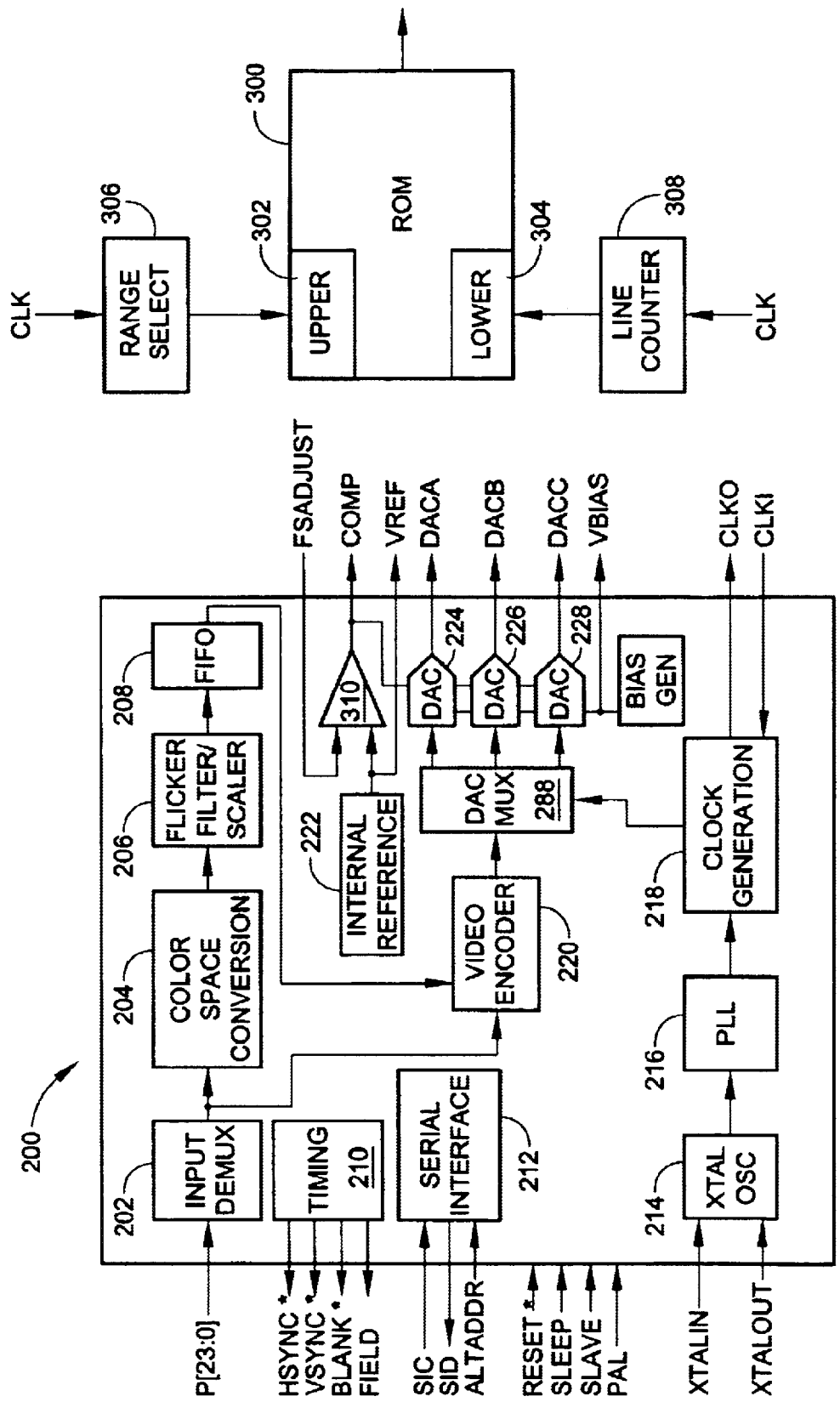

A functional block diagram of a device 200 for generating television-compatible video signals from YCrCb or RGB pixel data streams is set forth in FIG. 4. Device 200 accepts input formats from 640×480 to 800×600 resolution, and supports worldwide video standards including NTSC-M (North America, Taiwan, Japan), PAL-B,D,G,H,I (Europe, Asia), PAL-M (Brazil), PAL-N (Uruguay, Paraguay) and PAL-Nc (Argentina). Most preferably, device 200 is embodied in an 80-pin PQFP (Plastic Quad Flat Pack) package. As will be described in detail below, device 200 achieves horizontal scaling of input pixel data through modification of the encoder clock frequency.

Pixel data is input to device 200 from a computer video source such as a graphics controller at input demultiplexer ("DEMUX") 202. Preferably, the pixel data is provided to demultiplexer 202 on external pins P[23:0] at specific timing intervals and at an input pixel clock rate CLKI. The timing intervals and clock rate will be discussed in detail below in connection with timing block 210. For now, it is sufficient to say that the input pixel clock rate CLKI is normally the same as the encoder clock rate CLK (the rate at which encoder 220 encodes pixels).

Demultiplexer 202 accepts input pixel data formatted in either the RGB or YCrCb color spaces. In YCrCb mode, demultiplexer 202 can accept either 24-bit 4:4:4 data or 16-bit 4:2:2 data can be input. In RGB mode, either 15-bit 5:5:5, 16-bit 5:6:5 or 24-bit RGB can be input. Pixel data may be input two pixels at a time, in multiplexed fashion, clocked in on both the rising and falling edges of CLKI. In this mode, demultiplexer 202 receives pixel input on twelve external pins P[11:0]. FIG. 6 is a table that summarizes the external data pin assignments P[11:0] for multiplexed pixel input. For the RGB space, red data is designated R0–R7, green data is designated G0–G7 and blue data is designated B0–B7. For the YCrCb color space, Y data is designated Y0–Y7, Cr data is designated Cr0–Cr7, and Cb data is designated Cb0–Cb7. Alternatively, data may be input to demultiplexer 202 one pixel at a time, clocked in on the rising edge of CLKI. In this non-multiplexed mode, demultiplexer 202 receives pixel input on twenty-four external pins. FIG. 7 is a table that summarizes data pin assignments P[23:0] for non-multiplexed pixel input.

For 16-bit 4:2:2 YCrCb pixel data input, multiplexed Y, Cr and Cb data is input on eight external pins (P[11:4]). The Cr and Cb data is input on the rising edge of CLKI, and the Y data is input on the falling edge of CLKI. A Cb/Y/Cr/Y sequence begins with the first active pixel. For 24-bit 4:4:4 YCrCb pixel data input, multiplexed Y, Cr and Cb data is input on twelve external pins, P[11:0]. All Cr data and half of the Cb data is input on the rising edge of CLKI, and all Y data and the remaining half of the Cb data is input on the falling edge of CLKI. If 4:4:4 YCrCb data is input to demultiplexer 202, it is sub-sampled to 4:2:2 format before being fed to flicker filter/scaler 206. Sub-sampling is the process of sampling some pixel data (Cr and Cb) at a lower rate than other pixel data (Y). In the 4:2:2 format, for every two (Y) samples, one (Cb) sample and one (Cr) sample is taken.

For 15-bit 5:5:5 RGB pixel data input, three green bits and five blue bits are input on the rising edge of CLKI, and five red bits and two green bits are input on the falling edge of CLKI. The handling of 16-bit 5:6:5 RGB pixel data input is similar, with an extra green bit being sampled on the falling edge of CLKI. For 24-bit RGB pixel data input, eight blue bits and four green bits are sampled on the rising edge of CLKI, and eight red bits and four green bits are sampled on the falling edge of CLKI. If non-multiplexed 24-bit RGB pixel data or 24-bit YCrCb pixel data is supplied to demultiplexer 202, the pixel data is input one pixel at a time on the rising edge of CLKI utilizing twenty-four external pins.

Device 200 includes various registers for storage of important parameters, control and operating information. FIGS. 8a–b set forth a preferred register name and bit address map for device 200. As shown in FIGS. 8a–b, the registers occupy 8-bit (D7–D0) addresses 6C–D8. This is only one possible arrangement for the storage of the various operating parameters. Other register arrangements or storage methods could be utilized. FIGS. 9a–f define the function and content of the registers shown in FIG. 8a–b. The registers depicted in FIGS. 8–9 are discussed in detail throughout this specification.

Register IN_MODE[2:0] defines the format of the pixels that are input to device 200. The settings of register IN_MODE[2:0] and the corresponding input pixel formats are as follows:

| IN MODE[2:0] | Input Pixel Format |
|---|---|
| 000 | 24-bit RGB multiplexed |
| 001 | 16-bit RGB multiplexed |
| 010 | 15-bit RGB multiplexed |
| 011 | 24-bit RGB non-multiplexed |
| 100 | 24-bit YCrCb multiplexed |
| 101 | 16-bit YCrCb multiplexed |
| 111 | 24-bit YCrCb non-multiplexed |

Timing block 210 interfaces with the graphics controller of the computer or other source that is generating and delivering pixel data to demultiplexer 202. Timing block 210 generates the control signals HSYNC (horizontal sync output), VSYNC (vertical sync output), BLANK (composite blanking control) and FIELD (field control output). These control signals, along with the pixel input clock rate, are supplied by timing block 210 to the computer graphics controller and indicate to the controller when and when not to input pixel data to demultiplexer 202. Preferably, though not necessarily, the pixel input clocking rate CLKI is the same as the encoder clock rate CLK generated by clock generator 218.

The HSYNC control signal provides the graphics controller with horizontal pixel synchronization information for the input pixel data. It is a pulse two CLK cycles in duration whose leading edge indicates the beginning of a new line of pixel data. The period of the pulses, or the number of clocks per line between successive sync edges, is represented by the register H_CLKI. For NTSC 640×480 or 800×600 output, H_CLKI is, respectively, 784 or 880 clocks. For PAL 640×480 or 800×600 output, H_CLKI is, respectively, 944 or 960 clocks. Register H_BLANKI represents the number of clock pulses between the HSYNC leading edge and the first active pixel. For NTSC 640×480 or 800×600 output, H_BLANKI is, respectively, 126 or 66 clocks. For PAL 640×480 or 800×600 output, H_BLANKI is, respectively, 266 or 140 clocks. Hence, H_BLANKI clock cycles after the leading edge of HSYNC, the first active pixel is presented to device 200. The next H_ACTIVE pixels (640 or 800) are accepted as active pixels and used in constructing the output video waveform.

The VSYNC control signal provides the graphics controller with frame synchronization information for the pixel input data. It is a pulse one horizontal line time in duration whose leading edge indicates the beginning of a frame of input pixel data. The period of the VSYNC pulses, or the number of vertical input lines per frame, is stored in the V_LINESI register. For NTSC 640×480 or 800×600 output, V_LINESI is, respectively, 600 or 735 lines; for PAL 640×480 or 800×600 output, V_LINESI is, respectively, 625 or 750 lines. The first line of data should be presented to device 200 V_BLANKI lines after the leading edge of VSYNC. For NTSC 640×480 or 800×600 output, V_BLANKI is, respectively, 75 or 86 lines; for PAL 640× 480 or 800×600 output, V_BLANKI is, respectively, 90 or 95 lines. The next V_ACTIVEI lines (480 or 600) are accepted as active lines and used in construction of the output video waveform.

The BLANK control signal specifies to the graphics controller when input pixels should be blanked. Pixel blanking is generated based on the active area defined by the H_BLANKI, H_ACTIVE, V_BLANKI and V_ACTIVEI registers. The FIELD control signal specifies to the graphics controller when to generate even and odd fields.

Internal generation by timing block 210 of the HSYNC, VSYNC and BLANK control signals is preferred. This is the "master" mode of operation of device 200. It should be noted, however, that device 200 may operate in a "slave" mode wherein the HSYNC, VSYNC and BLANK signals are provided externally by a computer graphics controller or other device. A SLAVE input to device 200 is provided for selection of this mode. Operating in slave mode is not preferred because if the graphics controller does not properly time the HSYNC and VSYNC inputs, the output image will lose lock with the input. If the device is run in master mode, any timing errors that occur can be absorbed to some extent by FIFO 208.

Color space conversion block 204 receives RGB or YCrCb pixel input data from demultiplexer 202 and converts it to the YUV color space. This conversion process is well-known to those of ordinary skill in the art; see Background section above and Keith Jack, "Video Demystified," pages 39–61 for further detail. The color-space-converted pixel data is next processed by flicker filter/vertical scaler block 206. Block 206 converts the lines of input pixel data to an appropriate number of output lines for producing a full-screen image on the television receiver. Block 206 performs both overscan compensation, to ensure that the image is 100% in the vertical viewable area of the screen, and vertical filtering, to reduce the effects of picture flicker due to the interlacing of the output image. The amount of flicker filtering is programmable, as the process trades off vertical resolution in order to reduce flicker. Notably, block 206 filters only the vertical resolution; horizontal scaling is achieved by adjusting the encoder clock rate. No additional horizontal processing is performed on the input pixels. This allows the full horizontal resolution of the input pixels to be output. Suitable flicker filtering and vertical scaling techniques are discussed in Jack, "Video Demystified", pages 392–394.

The output of flicker filter/scaler 206 is fed into FIFO ("First-In First-Out") shift register 208. FIFO 208 stores the YUV pixel data input by scaler 206 and releases it to encoder 220 in sequential, interlaced fashion at the encoder clock rate. Essentially FIFO 208 absorbs any differences between the input pixel clock rate and the encoder clock rate. The function and operation of FIFOs is well known to those of ordinary skill in the art.

Video encoder 220 receives YUV pixel data from FIFO 208 at an encoder clock rate that is generated by clock generator 218. The encoder clock frequency is sufficient to encode all input pixel data into the active video portion of the composite waveform, without alteration or physical scaling of the pixel data.

Crystal oscillator 214, phase-locked loop (PLL) 216 and clock generation block 218 generate the encoder clock. Crystal oscillator 214 is chosen so that the precise line rate required for television broadcast signals can be achieved. It must be within 50 ppm of the maximum desired clock rate for NTSC operation and 25 ppm for PAL operation, across a temperature range of 0° C. to 70° C. A 13.5 MHz crystal is sufficient both for NTSC and PAL video standards. PLL 216 locks and synchronizes the clock to the horizontal sync rate, and has a frequency resolution sufficient to generate the precise color subcarrier frequency.

The encoder clock generated by block 218 is the frequency at which pixels incoming from FIFO 208 are encoded into a composite video waveform. Under the NTSC standard, the active video portion of the composite waveform is limited to a duration of approximately 52 µs. Based on this limitation, prior art encoders have utilized an encoder clock operating frequency of 13.5 MHz. At this rate, 640 pixels of data can be encoded during the duration of the viewable portion of the active video signal. Any incoming horizontal pixel resolutions exceeding 640 pixels, however, will not fit into the viewable portion of the active video signal at the encoding rate of 13.5 MHz. To counter this limitation, prior art encoders physically scale or filter the incoming pixels, through interpolation and averaging techniques, to a resolution of 640. Essentially, 800 pixels (for example) come in, are processed, and 640 pixels come out. The phenomenon of overscan exacerbates this dilemma since it reduces the viewable portion of the active video signal to only about 47 µs. The number of pixels encoded must be averaged or down-scaled even further in order to bring the entire image into the viewable portion of the display.

The present invention employs a novel approach to solving this problem. Rather than reducing the number of pixels that are encoded, through interpolation or averaging algorithms, clock generator 218 alters the clock rate (i.e., increases it) based on the incoming horizontal resolution so that all pixels are encoded within the viewable portion of the active video signal. Rather than being scaled through physical alteration, the pixels are effectively squeezed in time, or time-scaled. Essentially, the clock rate is increased to fit 800 pixels into the same amount of time that 640 pixels fit at a clock rate of 13.5 MHz. All incoming pixel data is encoded exactly as it was received from FIFO 208. The video quality is no longer dependent on a scaling algorithm, which is a function of multiple pixels and may work well for some images but not for others. The shape of the output composite waveform remains the same but is generated at a higher clock rate.

The approach of the present invention is also advantageous in that it simplifies the task of dealing with overscan. The amount of overscan generated by various televisions is not consistent or predictable; it can range from five to twenty percent. Moreover, the amount of overscan varies with the age of the television. Scaling algorithms employed by prior art encoders are based on specific predictions of the amount of overscan. The amount of overscan dictates the viewable portion of the active video signal, on which the scaling algorithms are based. If the actual amount of overscan does not closely correspond to the predicted amount, the scaling algorithm will not yield a properly placed image. With the present invention, the encoder clock rate can simply be fine-tuned according to the actual amount of overscan so that the image is properly placed.

By increasing the encoder clock frequency, the color burst waveform, horizontal sync pulse and active video data are all generated at an increased rate. The benefit of this method is that 800 pixels (or other horizontal resolutions) are encoded into the composite waveform without scaling; the pixel data fed to device 200 is exactly what comes out of encoder 220. The drawback is that generation of the horizontal sync pulse, color burst waveform and other timing components of the composite waveform is complicated. In prior art encoders, where the clock rate remains constant, the timing for generating the various aspects of the waveform is consistent and predictable. It is as simple as, "at clock count 128, output the leading edge of the horizontal sync pulse; at clock count 250, start the color burst, etc." This no longer holds true with a varying clock rate. The present invention provides an inventive method for outputting a consistent waveform meeting all required timing specifications. This method is outlined and discussed in detail herein in the detailed discussion of encoder 220.

Clock generator 218 generates the encoder clock frequency $f_{clk}$ (or CLK) for a given input computer video signal and output television signal format according to the following equation:

$$f_{clk}=f_{xtal}*((PLL\_INT[5:0]+(PLL\_FRACT[15:0]/2^{16}))/6);$$

where $f_{xtal}$ is the crystal frequency, usually 13.5 MHz; PLL_INT[5:0] is a register value representing the integer portion of a PLL multiplier; and PLL_FRACT[15:0] is a register value representing the fractional portion of the PLL multiplier. Hence, PLL_INT and PLL_FRACT are chosen to yield appropriate clock frequencies for given output resolutions and formats.

FIGS. 10–11 are tables that list the operating parameters for eight input (RGB or YCbCr, 640×480 or 800×600 resolution) and output (NTSC or PAL) video formats. These parameters are stored in an internal ROM and written to the appropriate registers upon selection of a particular input and output format. If, for example, the input pixel data is RGB 640×40, and NTSC output video is desired, PLL_INT is 12 and PLL_FRACT is 34830. Inserting these values into the above equation for determining the encoder clock rate, and assuming a crystal frequency of 13.5 MHz, yields an encoder clock frequency CLK of 28.195793 MHz. The encoder clock frequency is calculated for each of the eight input/output formats set forth in FIGS. 10–11 and is designated at the tops of the table columns. The PLL multipliers are programmable and may be adjusted by the user to yield an appropriate encoder clock frequency if input/output combinations other than the eight auto-configured ones are desired.

In addition to controlling the operation of encoder 220, the encoder clock frequency CLK is also preferably utilized to clock the graphics controller of the computer that is supplying pixel data to device 200. This is depicted in FIG. 4 as an output clock signal CLKO from clock generator 218. FIG. 4 also depicts an input signal CLKI to clock generator 218. CLKI is the clock rate at which the graphics controller is actually outputting pixel data to device 200, and is normally just a delayed version of CLKO. Incoming pixel data is received by demultiplexer 202 on the edges of CLKI and is then re-synchronized by FIFO 208 to the internally generated encoder clock CLK.

Use of an internal crystal oscillator, PLL and clock generator is the preferred method for generating the encoder clock frequency CLK. Alternatively, the encoder clock frequency could be generated externally and provided to generator 218 on input line CLKI. A register EN_XCLK is provided for this option; setting EN_XCLK to 1 provides for an externally generated, rather than an internally generated encoder clock. An internally generated encoder clock is strongly preferred to ensure that the output video waveform remains within the NTSC or PAL specifications. Any aberration in the encoder clock will be reflected in the output video and will detract from the quality of the image.

Finally, it is possible to bypass PLL 216 and set the encoder clock to the crystal frequency by setting the BY_PLL register bit to one. Normally, BY_PLL is zero and PLL 216 is used to generate the encoder clock frequency.

Figure 5A:
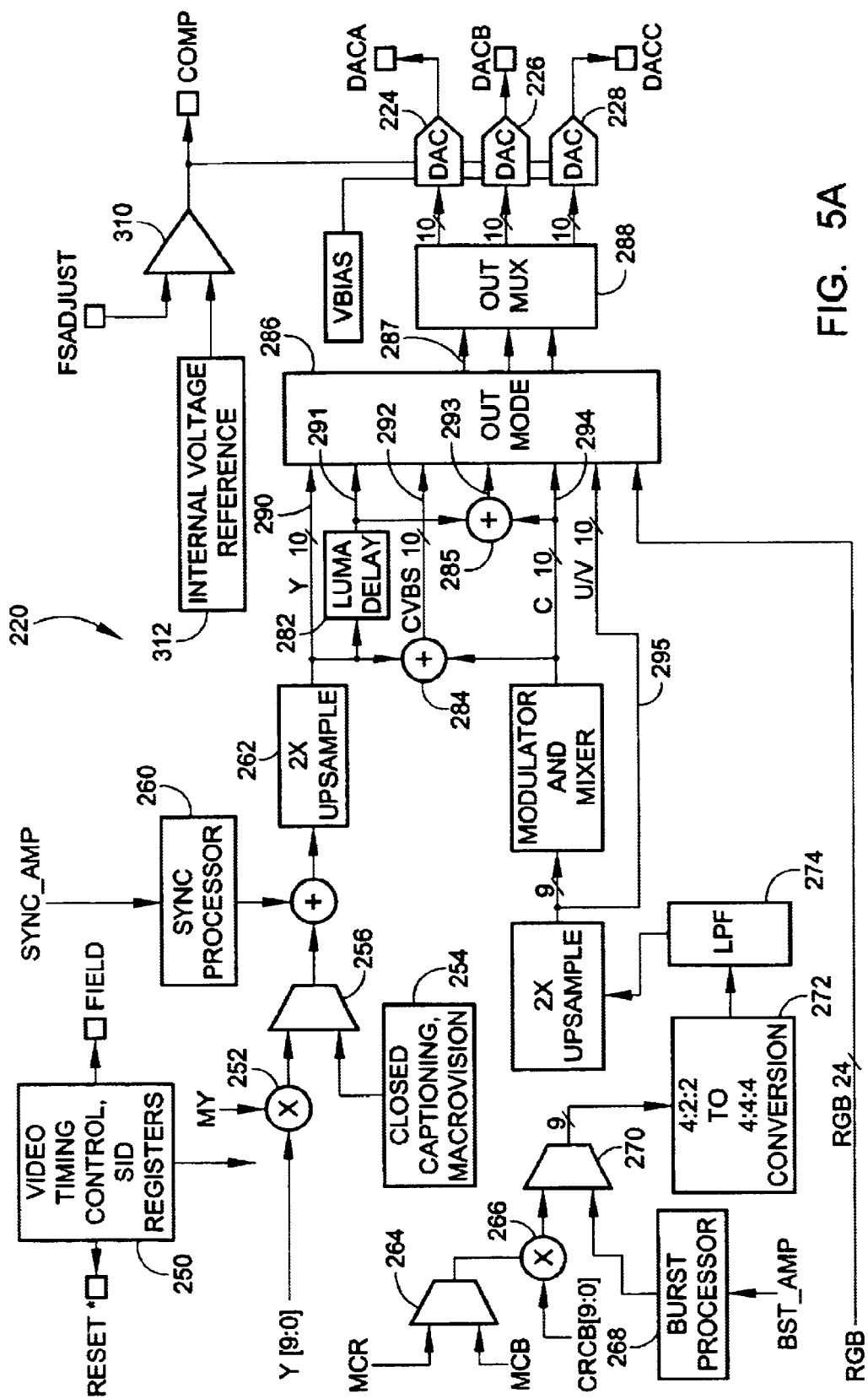
FIG. 5a is a more detailed diagram of the encoder portion of the device of FIG. 2.

Encoder 220 receives and encodes 4:2:2 YUV data from FIFO 208 at the encoder clock rate CLK generated by generator 218. FIG. 5a illustrates the components of encoder 220 in greater detail. Video timing control block 250 of encoder 220 generates the signals for extracting the processed pixels from FIFO 208 into encoder 220, and also generates signals for proper encoding of the processed pixels into a composite NTSC- or PAL-compliant waveform. The encoder clock CLK generated by clock generator 218 clocks timing block 250.

Timing block 250 performs analog video blanking in accordance with the parameters stored in the H_BLANKO, V_BLANKO, H_ACTIVE and V_ACTIVEO registers. Together these parameters define an active region where pixels will be displayed. V_BLANKO defines the number of lines from the leading edge of the vertical sync pulse to the first active output line, and V_ACTIVEO defines the number of output active lines per field. H_BLANKO defines the number of output pixels from the leading edge of the horizontal sync to the first active output pixel, and H_ACTIVE defines the number of active output pixels. Based on the above parameters, timing control block 250 blanks the video from the start of the horizontal sync interval through the end of the burst, as well as during the vertical sync period. This is performed in addition to blanking performed by the graphics controller itself (in response to the BLANK signal received from timing block 210) in order to prevent erroneous video timing generation.

A RESET signal may also be provided to timing block 250 to generate a timing and software reset of device 200. If the input RESET signal is held low for a minimum of two clock cycles, timing and software resets are performed. During a timing reset, serial interface 212 is held in a reset condition (serial interface registers set to zero), the horizontal and vertical counters are set to zero, and the subcarrier phase is set to zero. In a software reset, which can also be generated by setting the SRESET register bit, all serial interface registers are set to zero except for PLL_INT, which is initialized to 0x0C. The appropriate registers are then initialized to auto-configuration mode 0 (NTSC 640× 480; see FIG. 10).

Device 200 may be powered-down using the SLEEP input pin. If a logical 1 is presented on the SLEEP pin, a reset is generated on power-up that also generates both a timing and a software reset. After a reset condition has occurred, circuit 200 must be programmed through serial interface 212 to activate video or output one of the other preprogrammed video standards, as well as to enable the CLKO, HSYNC, VSYNC and FIELD outputs.

As discussed above, device 200 can be automatically configured for any one of eight input/output video formats. Essentially, the device may be programmed for any combination of RGB (FIG. 10) or YCbCr (FIG. 11) input, at pixel resolutions of 640×480 or 800×600, and NTSC or PAL composite video output. Device 200 can be configured to allow selection of the desired mode through an external pin or, alternatively, by appropriately setting the configuration register CONFIG[2:0]. All register parameters associated with all modes of operation are stored in an internal ROM. Upon selection of a particular input/output format, the appropriate parameters are loaded from the ROM into the appropriate registers.

Looking at one example, mode 0 provides for conversion of RGB 640×480 pixel input to NTSC composite output. To select this mode, the CONFIG[2:0] register is set to 000 (see FIG. 9b), or an appropriate signal is placed on an external pin. Following are some of the essential parameters that are programmed from the ROM into the registers if mode 0 is selected. The total number of active input and output pixels per line, H_ACTIVE, is 640. The width of the horizontal sync pulse in clocks, HSYNC_WIDTH, is 132. The color burst begins (50% point) 150 clock cycles from the horizontal sync falling edge (HBURST_BEGIN), and ends (50% point) 224 clock cycles from the sync pulse falling edge (HBURST_END+128). There are 381 output clocks between the leading edge of the horizontal sync pulse and the start of the active video (H_BLANKO). The line number of the first active line is 34 (V_BLANKO; the number of blank lines+1), and there are 212 active output lines/field (V_ACTIVE). There are 784 clocks per line between successive HSYNC edges (H_CLKI), and 126 input pixels between the HYSNC leading edge and the first active pixel (H_BLANKI). The number of vertical input lines (V_LINESI) is 600, there are 75 input lines between the VSYNC leading edge and the first active line (V_BLANKI) and there are 480 active input lines (V_ACTIVEI).

The encoder generates the pixel clock (EN_XCLK=0) using the PLL (BY_PLL=0). The fractional portion of the PLL multiplier (PLL_FRACT) is 34830, and the integer portion of the multiplier (PLL_INT) is 12. As discussed above, insertion of these PLL multipliers into the encoder clock frequency equation yields an encoder clock frequency of 28.195793 MHz. A 525-line (625LINE=0) interlaced (NI_OUT=0) format is utilized, and a 7.5 IRE setup is enabled for active video lines (SETUP=1). The multiplication factor for the sync amplitude (SYNC_AMP[7:0]) is 229, and the multiplication factor for the burst amplitude (BST_AMP[7:0]) is 118. The multiplication factors MCR [7:0] and MCB[7:0] for the CR and CB components prior to subcarrier modulation are, respectively, 121 and 68. The Y component multiplication factor MY[7:0] is 133, and the subcarrier increment MSC[31:0] used in generating the subcarrier frequency (discussed below) is 545259520.

Other registers are set in accordance with additional values provided in FIG. 10. Appropriate parameters for the remaining seven autoconfiguration modes are also set forth in FIGS. 10–11. The capacity to autoprogram the registers in accordance with desired input and output formats greatly reduces the software support required, yet full flexibility is retained in generating the video formats and timing. Once the device is configured, all registers are accessible and programmable through serial interface 212 to modify the modes. For less common input and output formats, for example, device 200 could be configured to the closest mode, with only those registers that differ being reprogrammed through serial interface 212.

The YUV pixel data is clocked into encoder 220 at the generated encoder clock rate CLK and is first scaled for the output range of DACs 224, 226 and 228. Multipliers 252 and 266 are provided for scaling, respectively, the Y and UV data. Multiplier 252 receives the Y data input and multiplies it by a scaling factor MY, and multiplier 266 receives U and V input and multiplies it by the scaling factors MCR and MCB. MCR and MCB are multiplexed through multiplexer 264 before being input to multiplier 266. The MCR, MCB and MY scaling functions allow various colormetry standards to be achieved, and may also be used to boost the chroma to compensate for the sin x/x loss of the DACS (described in more detail below).

For YCrCb input to demultiplexer 202, the scaling equations are as follows:

$MY = (int)((V_{100}/(219.0 * V_{FS}) * 2^6) + 0.5);$ $MCR = (int)(((128.0/127.0) * V_{100} * 0.877/(224.0 * V_{FS} * 0.713 * \sin x) * 2^6) + 0.5);$ and $MCB = (int)(((128.0/127.0) * V_{100} * 0.493/(224.0 * V_{FS} * 0.564 * \sin x) * 2^6) + 0.5).$ For RGB input to demultiplexer 202, the scaling equations are as follows:

$MY=(int)((V_{100}/(255.0*V_{FS})*2^6)+0.5);$ $MCR=(int)(((128.0/127.0)*V_{100}*0.877/(127.0*V_{FS}*\sin x)*2^5)+0.5);$ and $MCB=(int)(((128.0/127.0)*V_{100}*0.493/(127.0*V_{FS}*\sin x)*2^5)+0.5).$ In the above scaling equations, $V_{100}$=100% white voltage (0.661V for NTSC; 0.7V for PAL); $V_{FS}$=full scale output voltage (1.28V); and $\sin x=(\sin(2\pi f_{SC}/f_{CLK}))/(2\pi f_{SC}/f_{CLK})$. Registers MCR[7:0], MCB[7:0] and MY[7:0] are provided for storing the scaling factors. FIGS. 10 and 11 list the values of MCR, MCB and MY for various input and output video format combinations.

With reference to FIG. 5*a*, the processing of the scaled Y pixel data by encoder 220 is considered first. The input Y data, scaled by the scaling factor MY, is output by multiplier 252 and fed to multiplexer 256. Closed captioning and Macrovision® data may be generated by block 254 and inserted in appropriate scan lines as luminance (Y) data. For NTSC/PAL-M, closed captioning data is encoded on scan line 21 and extended data is encoded on scan line 284. For PAL-B, D, G, H, I, N, Nc, encoding takes place on scan lines 22 and 335. Pixel input data is ignored during CC encoding. Four 8-bit registers (CCF1B1, CCF1B2, CCF2B1 and CCF2B2) provide the CC data and register bits ECCF1 and ECCF2 enable display of the CC data. Further information about these registers is provided in the programming detail table set for in FIG. 9*c*. Closed-caption (CC) encoding is performed according to the standards of the National Captioning Institute. Further detail about closed-captioning may be found in Jack, "Video Demystified", pages 213–231. Macrovision® is a copy protection feature that may be supported by device 200. Further detail may be found in Jack, "Video Demystified", pages A-24 to A-25.

Sync processor 260 generates sync signals that are added, at the required timing intervals, to the scaled luminance data. In prior art encoders, a horizontal line counter is incremented in accordance with an encoder clock that is clocked at a specific and constant frequency under all conditions. A consistent and predictable horizontal sync waveform that meets the appropriate specification is generated simply by outputting appropriate waveform values at particular horizontal line counts. All other timing signals (blanking interval, color burst waveform, vertical sync pulse) are generated in the same manner, that is, as simple decodes of the horizontal line counter.

The horizontal sync pulse, for example, must be 4.7 µs in width under the NTSC standard. Prior art encoders traditionally utilize a 13.5 MHz clock frequency under all conditions. Hence, clock count zero will always correspond to the beginning of the horizontal sync pulse, and some other clock count (x), 4.7 µs later, will always correspond to the end of the sync pulse. The proper waveform values are simply inserted into the luminance data stream at the proper times. Everything is consistent and repeatable, and the counts or timing markers always remain the same, because there is always one clock rate.

As described herein, encoder 220 effectively time-scales the incoming horizontal pixel data by using a variable encoder clock frequency that tracks the incoming horizontal pixel resolution. While this has the advantage of horizontally scaling the input pixel data without averaging or other loss of resolution, it has a drawback in that the line counts at which sync or other waveform values should be generated no longer have a predictable, linear relation to the clock count. Particular counts are no longer associated with particular waveform values. The shape of the composite video waveform and the timing of the sync pulses, color burst, etc., however, must remain the same regardless of the clock conditions under which the waveform is generated. The present invention addresses this problem.

As illustrated in FIG. 5*b*, waveform values appropriate for a range of clock rates are stored in the upper address bits 302 of a ROM 300. For the horizontal sync pulse, for example, these values include falling and rising edge waveforms, and the sync pulse width in clock pulses. The encoder clock rate CLK generated by clock generator 218, which is a function of the input and output video formats selected by the user, is scaled to a digital value by range selector 306. This value corresponds to a particular group of waveform values stored the upper addresses 302 of ROM 300. These waveform values are matched with line counts associated with that particular encoder clock rate. The variable encoder clock CLK also clocks horizontal line counter 308. At appropriate line counts, ROM 300 provides appropriate waveform values to sync processor 260 (or an appropriate register). Sync processor 260, in turn outputs the appropriate waveform values to adder 258 to be added to the luminance data stream at the proper location. Hence, a consistent horizontal sync pulse is generated independent of the actual clock rate.

The beginning of the horizontal sync pulse corresponds to the reset of line counter 308. At this time, and for an appropriate number of counts thereafter (again, depending on the frequency of encoder clock CLK) ROM 300 provides the appropriate sync fall waveform values from upper addresses 302 to processor 260, which inserts the values into the luminance data. For NTSC and PAL composite waveforms, the sync waveform must meet strict rise and fall times. The fall time for the NTSC horizontal sync pulse, for example, is 138 ns. As the encoder clock rate is increased, it follows that more clock counts will be required to encode the fall waveform within the same 138 ns.

The duration (in clock pulses) of the horizontal sync pulse that corresponds to the encoder clock rate is loaded from ROM 300 into the horizontal sync width register (HSYNC_WIDTH[7:0]). For RGB 640×480 input and NTSC output, for example, a clock rate of 28.195793 MHz is generated by generator 218 and a horizontal sync pulse width HSYNC_WIDTH of 132 clock counts is required. Generally, the greater the encoder clock frequency, the longer the width of the horizontal sync pulse in clock counts must be in order to maintain the same duration of 4.7 µs. Sync pulse widths corresponding to other input resolution and output format combinations are listed in FIGS. 10 and 11. The sync pulse amplitude multiplier SYNC_AMP is loaded into a register by ROM 300 and is provided to sync processor 260. For NTSC output, SYNC_AMP is 229; for PAL output, SYNC_AMP is 240.

Sync processor 260 also inserts vertical sync pulses into the luminance data, where appropriate. The duration of the vertical sync is selectable as either 2.5 or 3 lines by register bit VSYNC_DUR.

Figure 12:
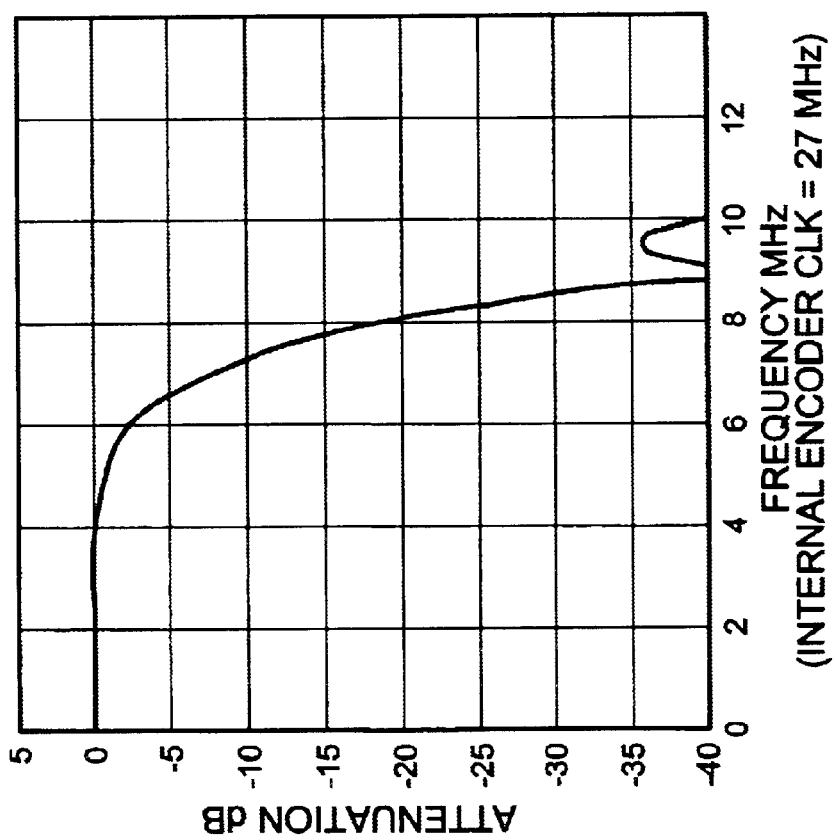

The luminance/sync data is filtered through 2×-upsampling filter 262. Upsampler 262 alleviates external filtering requirements by moving significant sampling alias components above 19 MHz and reducing the sin x/x aperture loss. The frequency response of upsampler 262 is illustrated in FIG. 12. The upsampled luminance data is supplied to output mode selector 286 in a number of combinations: it is supplied directly to selector 286 on line 290 in component Y format; it is passed through luma delay circuit 282 and supplied as delayed luminance data on line 291 (delaying the luminance data is sometimes desirable as the chrominance video path has a longer delay than the luminance video path); it is added to composite chrominance data via adder 284 and supplied to selector 290 on line 292 as a composite video waveform; and the delayed luminance data output from delay 282 is also added to the chrominance data via adder 285 to output a delayed composite video waveform to mode selector 286 on line 293.

Turning to the processing of the UV data, it is input to multiplier 266 where it is scaled and converted to U/V data by scaling factors MCR and MCB, as described above. The U/V data is then fed to multiplexer 270. Burst processor 268 adds the color burst waveform to the chrominance data at appropriate locations. The problem of generating a consistent and accurately timed color burst waveform under variable encoder clock conditions is dealt with in a manner identical to that of sync processor 260. Color burst waveform values appropriate for a range of clock rates are stored in the upper address bits 302 of ROM 300. These values include the fall and rise waveforms for the nine-cycle sine wave color burst waveform, the subcarrier frequency increment (used to generate the subcarrier frequency), and the pixel locations for the beginning and end of the burst waveform. The encoder clock rate CLK generated by clock generator 218, which is a function of the input resolution and output format selected by the user, is scaled to a digital value by selector 306 that corresponds to an upper address bit of ROM 300. For each clock frequency range, ROM 300 has stored appropriate burst waveform values corresponding to horizontal line counts generated by counter 308. These waveform values are provided to burst processor 268 (or an appropriate register) at the proper line counts. Burst processor 268 outputs the burst waveform data to multiplexer 270 to be inserted into the chrominance data stream at the proper locations. A consistent and accurately timed color burst waveform is generated independent of the encoder clock rate, which is variable.

The chrominance and color burst information is generated at a subcarrier frequency required by the desired broadcast standard. A subcarrier increment or scaling factor is used to generate the desired subcarrier frequency and is calculated by the following equation:

$$MSC = (int)(2^{32} * f_{SC}/f_{CLK} + 0.5),$$ or more directly, for NTSC: $MSC = 2^{32} * (455/(2*H\_CLKO))$; and for PAL: $MSC = 2^{32} * ((1135/4 + 1/625)/H\_CLKO)$.

In the above equations, $f_{SC}$ is the subcarrier frequency, $f_{CLK}$ is the encoder clock rate, and H_CLKO is the number of output clock pulses per horizontal line. With MSC, any desired subcarrier frequency may be generated to enable the generation of any desired video standard. The discrete-time oscillator divides down the internal clock rate by a factor of MSC to generate the subcarrier frequency. FIGS. 10–11 list subcarrier increments (MSC) for various input and output format combinations. The subcarrier increment must be programmed into the MSC register or loaded via serial interface 212 before the subcarrier can be enabled. In order to prevent residual errors from accumulating, the subcarrier DTO (Discrete Time Oscillator) is reset every four fields for NTSC formats and every eight fields for PAL formats.

Figure 13:
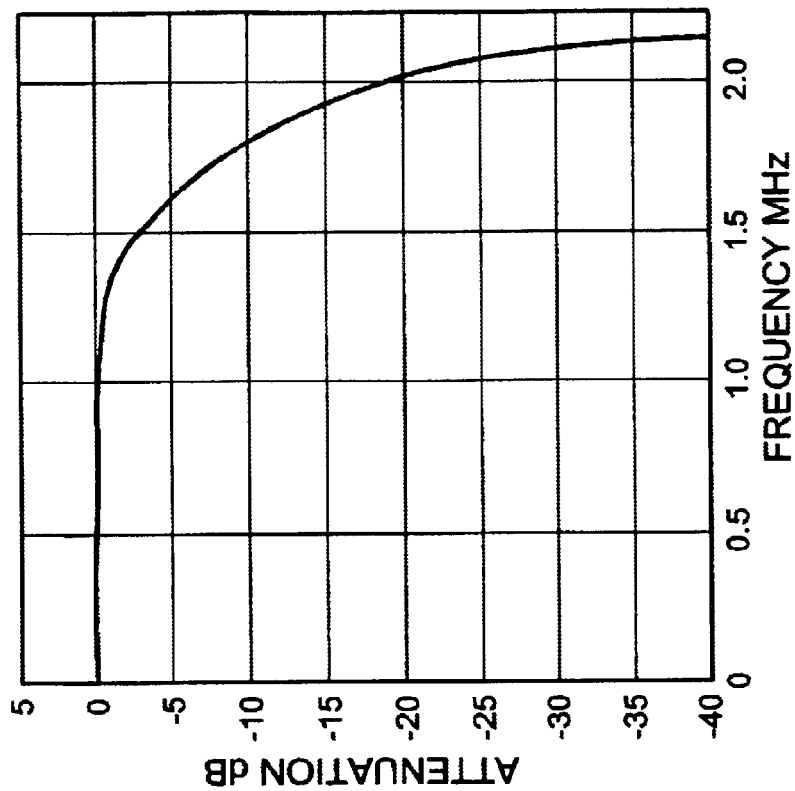

Burst processor 268 generates the burst waveform as a function of the subcarrier frequency increment (MSC), the burst horizontal begin and end register settings (HBURST_BEGIN and HBURST_END), the burst rise and fall waveforms stored in ROM 300, and the burst amplitude (BST_AMP). For RGB 640×480 input and NTSC output, for example, MSC is 545259520; the burst begins at line count 150 and ends at line count 224, and has a BST_AMP multiplier value of 118. Again, ROM 300 loads the values corresponding to particular clock frequencies into the appropriate registers The chrominance U/V data, including the color burst waveform, if applicable, is fed from multiplexer 270 to converter 272 where it is converted back to 4:4:4 format (to equal the luminance sampling frequency). The UV components are then passed through a low pass filter 274 having the frequency response illustrated in FIG. 13. Next, the U/V components are filtered through 2×-upsampler 276, which has the filter response illustrated in FIG. 12.

The filtered and upsampled U/V data is supplied directly to output mode selector 286 as U and V component data on line 295, and is also passed through modulator and mixer 278 to yield a quadrature amplitude modulated (QAM) chrominance (C) signal. The QAM C signal is generated by multiplying the U data by sine and the V data by cosine (or vice-versa), and adding the two together to yield a modulated 3.58 MHz QAM signal. The upsampled and modulated chrominance (C) data is supplied to output mode selector 286 directly on line 294 in component format; in combination with the Y data via adder 284 on line 292 (composite video); and in combination with the delayed Y via adder 284 on line 293 (luma-delayed composite video).

Output mode selector 286 generates output video signals on three lines 287, which are connected to output multiplexer (MUX) 288. There are four modes for the video outputs, selected by register OUT_MODE. The first mode (OUT MODE=0) generates composite video, luma (Y), chroma (C) and delayed luma (Y_DLY). The second mode (OUT_MODE=1) generates luma-delayed composite video, luma (Y), chroma (C) and delayed luma (Y_DLY). The third mode (OUT_MODE=2) generates component YUV and delayed luma (Y_DLY). The fourth mode (OUT_MODE=3) generates VGA-style RGB outputs. Registers (LUMADLY) are provided to control the amount of delay for the delayed luma, which can be from 0 to 3 clocks.

For each of the output modes, any of the four generated outputs can be muxed to any of the three output DACs 224, 226, 228 by setting registers OUT_MUXA, OUTMUX_B and OUT_MUXC. DACs 224, 226 and 228 are designed to drive standard video levels into a combined RLOAD of 37.5 Ω (doubly terminated 75 Ω). The DAC output response is a discrete waveform with a typical sinx/x response. For composite video output, this results in a slightly lower than desired burst and chroma amplitude value. To compensate, the burst and chroma gain as programmed by the BST_AMP and MCR/MCB register values can be boosted by x/sinx. The sinx/x amplitude reduction is calculated by:

$$\sin x/x = \sin(\pi * f_{SC}/f_{CLK})/(\pi * f_{SC}/f_{CLK}).$$

Alternatively, an output filter could be used to boost the frequency response to a slightly higher level.

Serial interface 212 is a two-wire serial interface that is provided to program the registers in device 200 if the pre-programmed modes are not used. Every byte put onto the SID (Serial Interface Data) line should be 8 bits long (MSB first), followed by an acknowledge bit, which is generated by the receiving device. Each data transfer is initiated with a start condition and ended with a stop condition. The first byte after a start condition is always the slave address byte. If this is the device's own address, the device will generate an acknowledge by pulling the SID line low during the ninth SIC (Serial Interface Clock) pulse, then accept the data in subsequent bytes (auto-incrementing the subaddress) until another stop condition is detected. The eight bit of the address byte is the read/write (R/W) bit (high=read from addressed device; low=write to addressed device). For device 200, the subaddress is considered valid only if the R/W bit is low. Serial interface 212 is operable with either 3.3V or 5V input levels.

Comparator 310 receives inputs from Internal Voltage Reference 312 (1.2V) and the Full Scale Adjust (FSADJUST) current source, and sets all of the DACs to track the reference current. The output of comparator 310 is also fed to a COMP pin which must be decoupled to the closest VAA pin, typically with a 0.1 μF ceramic capacitor. The capacitor should be as close as possible to the COMP and VAA pins. A surface-mount capacitor is preferred for minimal lead inductance, which degrades the noise rejection of the circuit. VREF and VBIAS should also be decoupled to ground with a 0.1 μF capacitor.

As described in detail above, the various aspects and features of the invention allow computers such as, for example, personal computers and other computing devices to display video and image data to both non-interlaced (computer) monitors, as well as NTSC TV receivers. Because the device can be connected to a number of different monitors and receivers, it is beneficial to determine whether a monitor is connected to the encoder output on power up of the device, and if so, which type of monitor is connected. This allows the appropriate software to be loaded and run for the given type of monitor connected. As such, another aspect of the invention provides a system and method for determining whether and what type of monitor is connected to the output of the TV encoder, thereby giving the processor information that can be used to load and execute the appropriate software routines.

According to one embodiment of this aspect of the invention, a terminating resistor is provided at the output of the DAC such that the output is always terminated regardless of whether a display device is connected. Preferably the impedance presented by the terminating resistor is equal to the impedance provided by a monitor that would typically be connected to the output of the DAC. As a result, in addition to the termination resistance of the monitor, the DAC drives a parallel impedance. This ensures that the output signal will never be driving a high impedance, or open circuit, which could potentially cause the signal to be driven to undesirably high voltages. As a result of this configuration, an unconnected output is still driving an impedance as provided by the terminating resistor.

Another aspect of the invention, which determines the type of display device connected, takes advantage of the fact that the terminating resistance changes depending on whether a display device is connected to the output of the DAC. When a display device is connected to the output of the DAC, the display device provides an impedance in parallel to that providing by the terminating resistance. Therefore, the output impedance driven by the DAC decreases where a television, monitor or other display device is connected. More specifically, in one example application, if the terminating resistor provides an impedance equal to that of the connected monitor, the effective termination resistance seen by the device when a monitor is connected is half that of the terminating resistance seen by the DAC with no monitor connected.

Thus, according to the invention, current is driven by the DAC to the output terminal. As a result of the termination resistance, a voltage level is created at the output of the DAC. The voltage level will vary depending on whether a monitor is connected to the video output terminal. Therefore, this voltage level can be compared to a reference voltage level to determine whether or not a monitor is connected to the output.

Figure 14:
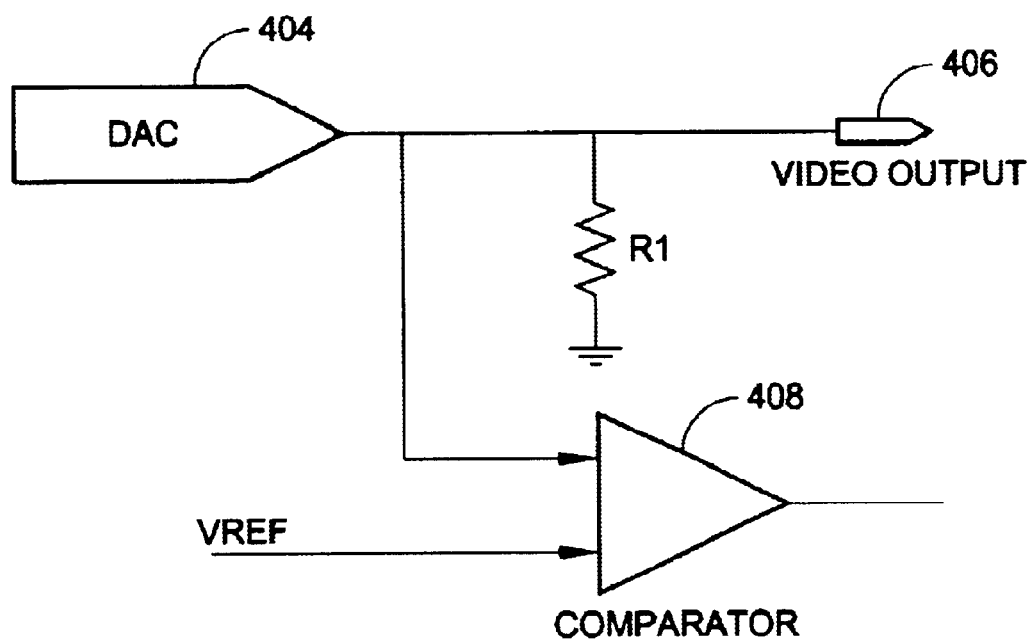
FIG. 14 is a schematic diagram of a circuit that can be used to implement the monitor detection feature according to one embodiment of the invention.

FIG. 14 is a schematic diagram of a circuit that can be used to implement the monitor detection feature according to one embodiment of the invention. Referring now to FIG. 14, a terminating resistor R1 is provided at the output of DAC 404. As stated above, R1 is preferably equal to the termination resistance of the typical monitor that might be connected to video output 406. However, as would become apparent to one of ordinary skill in the art after reading this description, alternative values for R1 can be chosen and implemented.

In one embodiment of the invention where the resistance of R1 equals that of the anticipated display device, the resistance of R1 is selected as 75 ohms. When a current level is driven by DAC 404 to video output 406, a voltage level is created. The voltage level is a function of the current and any resistance seen at the output which includes a combination of the resistance provided by terminating resistor R1 and a monitor, if connected. As provided by ohms law:

$$V=IR$$

The voltage V at the output of DAC 404 is equal to the current level I output by the DAC times the resistance presented by R1 and the display device (if present). If the DAC output is unterminated, the resistance R simply equals R1. If, on the other hand, the output is terminated to a monitor or other display device, in the embodiment where the terminating resistor is equal to the resistance of the monitor, the resistance provided by the output is equal to ½R. Because the resistance in this example embodiment can change by a factor of 2, so can the resultant voltage at the output of DAC 404, depending on whether a display device is present. As such, comparator 408 can be driven by a reference voltage between the range of voltages that can be seen by DAC 404 for a given current level in both the terminated and unterminated states (e.g., with and without a display device being connected). The output of comparator then provides an indication of whether a monitor or other display device is connected to video output pin 406. The output of the comparator 408 can be configured to provide a 1 or 0 for example for digital applications, or a positive or negative signal or other level for analog applications.

Figure 15:
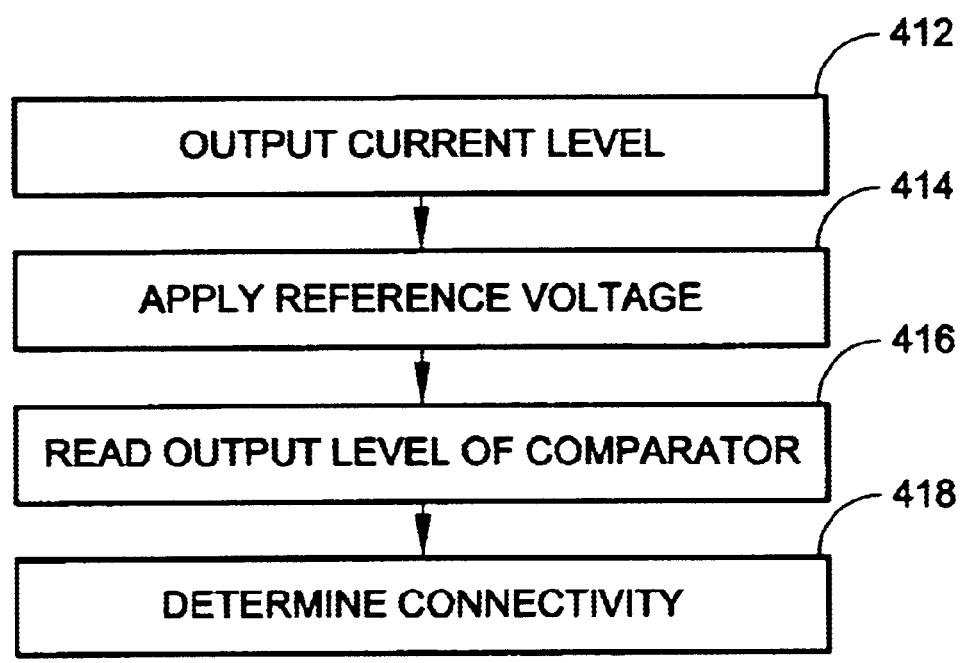
FIG. 15 is an operational flow diagram illustrating a process for determining whether a monitor is connected to the video output pin according to one embodiment of the invention.

FIG. 15 is an operational flow diagram illustrating a process for determining whether a monitor is connected to the video output pin according to one embodiment of the invention. Specifically, FIG. 15 discusses the process in terms of the embodiment illustrated in FIG. 14. Referring now to FIGS. 14 and 15, in a step 412, DAC 404 outputs a current level. In alternative embodiments, DAC 404 could output a voltage level instead of a current level. However, as would be apparent to one of ordinary skill in the art after reading this disclosure, the comparison instead of being a voltage comparison in parallel with the termination resistance, would be a current comparison done in series.

In a step 414, the reference voltage VREF is applied to comparator 408. As stated above, reference voltage VREF is selected to lie between the maximum and minimum voltage levels expected at the output of the DAC depending on whether a monitor is connected to output pin 406. Under ideal conditions, the maximum voltage is $$V=I*R1$$

and the minimum is:

$$V=I*R1*R2/R1+R2$$

where R2 is the impedance provided by the display. Where R1=2:

$$R1*R2/R1+R2=½R1=½R2$$

Thus, for example, in an embodiment where the impedance presented by R1 is substantially equal to that of the display, VREF is selected as:

$I*R1 < VREF < I*½R1$

Preferably, the reference voltage VREF is selected as substantially midway between the maximum voltage level as seen by the DAC 404 when a monitor is not connected, and the minimum voltage provided when a monitor is connected to pin 404. By selecting the reference voltage VREF at the midway point between these two extremes, the effects of noise on the system can be minimized. For example, consider a scenario in which DAC 404 drives a current of 100 milliamps (mA), the impedance of a typical display device is 75 ohms, and R1 is selected as 75 ohms. In this example scenario, if a monitor is not connected to output pin 406, the impedance seen by DAC 404 is 75 ohms and the voltage level provided to the input of the comparator is 7.5 volts. If, on the other hand, a monitor is connected to pin 406, the effective impedance seen by DAC 404 is 37.5 ohms, and the resultant voltage at the input of comparator 408 is 3.75 volts. Thus, in this example scenario, in a preferred embodiment voltage reference VREF is chosen as approximately 5.625 volts, or midway between the minimum expected voltage of 3.75 volts and the maximum expected voltage of 7.5 volts.

In a step 416, the output level of comparator 408 is read to determine whether a monitor is connected to pin 406. For example, depending on the configuration of the comparator, the output can be selected as being positive when the DAC voltage is greater than the reference voltage VREF. In this embodiment, the output of comparator 408 is positive when a monitor is not connected to pin 406 and negative if a monitor is connected to pin 406. Therefore, in a step 412, the device can use this level to determine whether a monitor is connected to pin 406.

In one embodiment, the output of comparator 408 can be provided to a register or other storage location such that the output can be polled or read by a processor at a given point in time or at a predetermined polling interval. Thus, the process described above can be implemented at a point in time when it does not interfere with the video signal and periodically read by a processor at a point in time that is most convenient for the processor. Preferably, in one embodiment, the process of testing for the connection of the monitor as described above, is performed during the vertical blanking interval (VBI) or during the overscan time to minimize or eliminate the impact of the current level on an output signal. Typically, the process described above can be performed in two to three clock cycles such that they can be completed within the VBI or the overscan time interval.

According to another aspect of the invention, it can be used to determine not only whether a monitor is connected, but also to determine what type of monitor is connected. For example, a composite video monitor typically has one composite video input. In contrast, an S video monitor utilizes two video components: luminance; and chrominance. Still further, an RGB monitor utilizes three components and therefore three video outputs, one for each of the corresponding RGB components.

Figure 16:
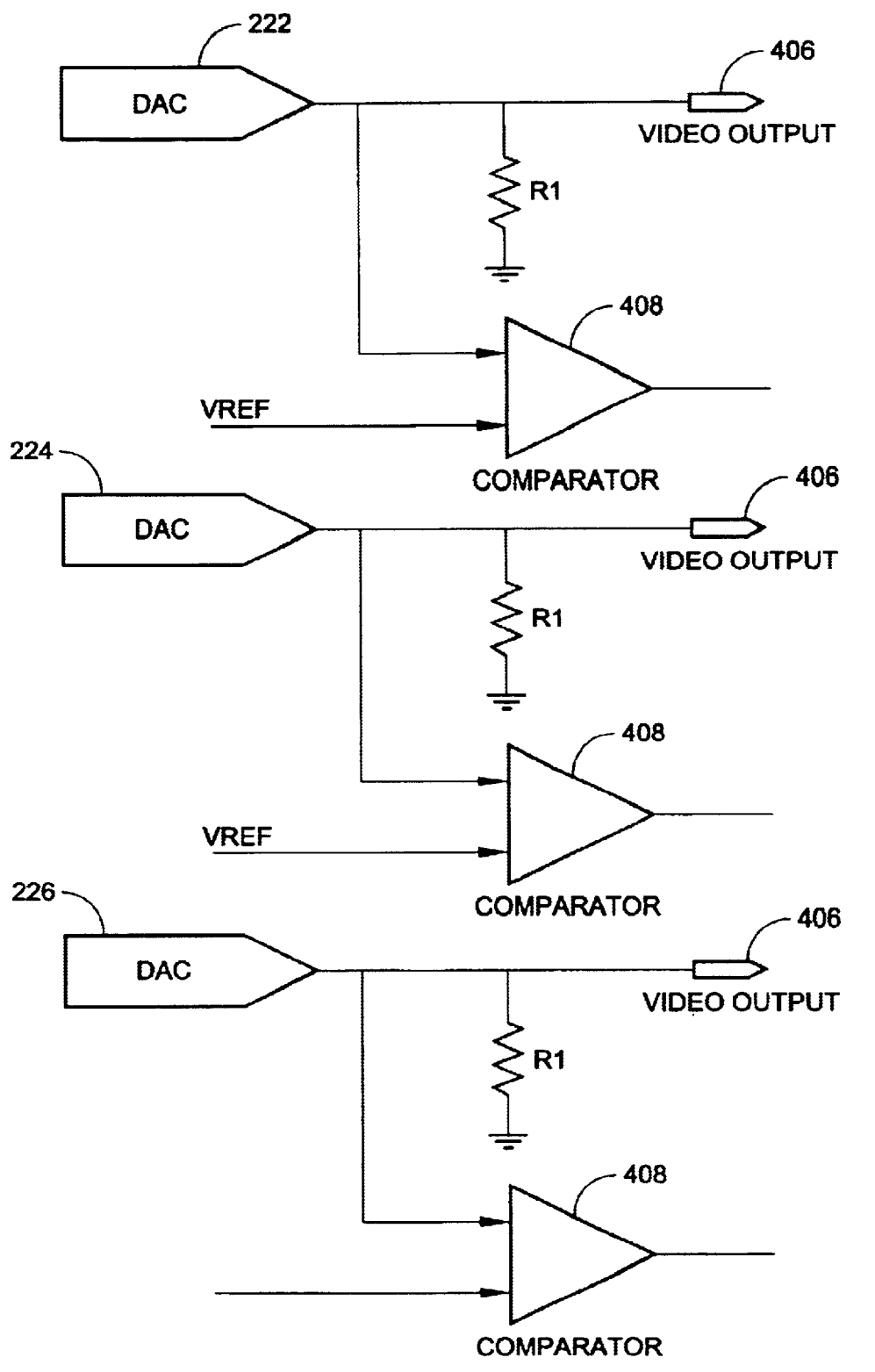
FIG. 16 is a schematic diagram illustrating an example implementation of the detection device to detect the type of monitor to connect at the output of a video driver such as that found in encoder 220 according to one embodiment of the invention.

In implementing this aspect of the invention, the detection device can be implemented for each of the output DACs 404. For example, in implementing the detection device with an encoder such as that illustrated in FIG. 5A, the detection circuitry can be provided at the output of each DAC 224, 226, and 228. Depending on which pins a monitor is detecting, it will indicate the type of monitor connected to the output of the encoder. FIG. 16 is a schematic diagram illustrating an example implementation of the detection device to detect the type of monitor to connect at the output of a video driver such as that found in encoder 220 according to one embodiment of the invention. As illustrated in FIG. 16, the circuitry, which includes comparator 408, reference voltage signal VREF and terminating resistance R1 is provided for each of DACs 222, 224 and 226. Thus, the outputs of comparators 408 for each of these DACs can be made available to a processor, state machine, logic circuitry, analog circuitry or other device to determine whether a monitor is connected, and if so, whether the monitor is, for example, an RGB monitor, a composite video monitor or an S-video monitor.

Figure 17:
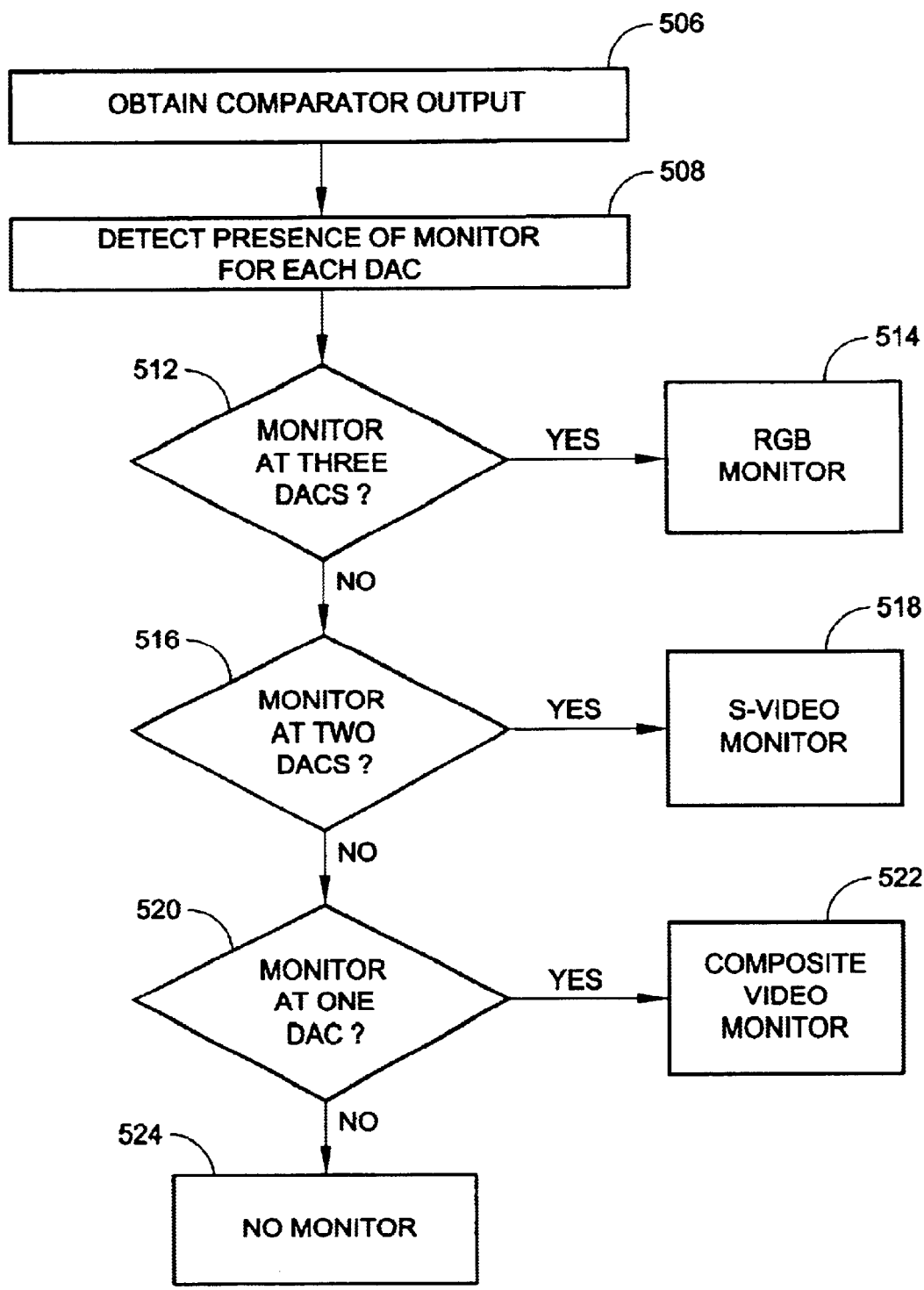
FIG. 17 is a flow diagram illustrating a process according to the present invention for detecting whether and what type of monitor is connected to the output of an encoder.

FIG. 17 is an operational flow diagram illustrating a process for detecting whether a monitor is connected to the output of a device such as encoder 220 and if so, determining which type of monitor is connected in accordance with one embodiment of the invention. Referring now to FIG. 17, in a step 506, the comparator output for each of comparators 408 is obtained. Based on this comparator output, in a step 508 the system detects the presence of a monitor connection for each DAC 224, 226 and 228. If a monitor connection is provided for each of the three DACs 224, 226 and 228, the system determines that it is an RGB monitor connected to encoder 220. This is illustrated by steps 512 and 514.

If, instead, the system determines, based on the output of the comparators 408, that a monitor connection is only provided for two of the DACs 224, 226, the system determines that an S-video monitor is connected. This is illustrated by steps 516 and 518. Alternatively, if the system determines that a monitor connection is provided only at one DAC 224, then the system determines that the monitor connected is a composite video monitor. Of course, if the presence of a monitor connection at one DAC is not detected in step 520, this indicates that no monitor is present as illustrated by step 524.

Although this aspect of the invention is described in conjunction with an encoder such as encoder 220, it will become obvious to one of ordinary skill in the art after reading this description that the monitor detection aspects of the invention can be implemented with any video output device.

In implementations where the detection device is implemented with an encoder such as encoder 220 or other integrated device, it is important to note that the detection circuitry can be implemented on-chip. As such, additional pin-outs are not required for the termination resistance and the comparator and other detection circuitry. As illustrated by the embodiments shown in FIGS. 14 and 16, the termination resistance RI and comparators 408 can be provided on-chip and the comparator output can be provided back to an on-chip processor or to a separate chip via an existing bus configuration. As such, additional connections or pin-outs are not required. This is advantageous, especially in situations where device size or pin out availability is limited.

While particular embodiments of the present invention have been described above, it should be understood that they have been presented by way of example only, and not as limitations. The breadth and scope of the present invention is defined by the following claims and their equivalents, and is not limited by the particular embodiments described herein.

What is claimed is:

1. An apparatus for detecting the presence of a display device at the output of a video driver, comprising:

a terminating resistance connected between the output of the video driver and a ground level;

an output connector coupled to the output of the video driver and configured to accept connection of a display device;

a comparator having a first input connected to the output of the video driver, a second input connected to a reference voltage signal, and an output;

wherein an output current from the video driver results in a voltage level at the first input of the comparator, the voltage level varying depending on whether or not the display device is connected to the output connector, thereby causing the output of the comparator to indicate whether the display device is connected;

and wherein the presence of the display device is detected during a vertical blanking interval.

2. An apparatus for detecting the presence of a display device at the output of a video driver, comprising:

means for connecting a video display device to the video driver;

means for providing a terminating resistance at the output of the video driver, independently of whether a display device is connected; and means for comparing, during an overscan time interval, a reference voltage signal with a voltage level generated at the output of the video driver by a current provided by the video driver to determine whether a display device is connected to the output of the video driver.

3. A method for determining whether a display device is connected at the output of a video driver, comprising:

providing a terminating resistance at the output of the video driver, independently of whether a display device is connected;

driving a current level at the output of the video driver; and during a time interval lasting two to three clock cycles, comparing a resultant voltage at the output of the video driver with a reference voltage level to determine whether a display device is connected to the output of the video driver.

4. A method as claimed in claim 3, wherein the time interval is a vertical blanking interval.

5. A method as claimed in claim 3, wherein the time interval is an overscan time interval.

* * * * *